United States Patent
Pennarun et al.

(10) Patent No.: US 11,140,207 B2
(45) Date of Patent: Oct. 5, 2021

(54) NETWORK IMPAIRMENT SIMULATION FRAMEWORK FOR VERIFICATION OF REAL TIME INTERACTIVE MEDIA STREAMING SYSTEMS

(71) Applicant: GOOGLE LLC, Mountain View, CA (US)

(72) Inventors: Avery Pennarun, New York City, NY (US); Kuangye Guo, Sunnyvale, CA (US); Robert McCool, Menlo Park, CA (US); Dov Zimring, Belmont, CA (US); Neal Cardwell, New York, NY (US); Saif Khalaf, Mountain View, CA (US); Jani Huoponen, Los Gatos, CA (US); Soheil Hassas Yeganeh, New York, NY (US); Gurudas Somadder, Saratoga, CA (US)

(73) Assignee: Google LLC, Mountain View, CA (US)

( * ) Notice: Subject to any disclaimer, the term of this patent is extended or adjusted under 35 U.S.C. 154(b) by 281 days.

(21) Appl. No.: 15/851,610

(22) Filed: Dec. 21, 2017

(65) Prior Publication Data
US 2019/0199772 A1     Jun. 27, 2019

(51) Int. Cl.
*G06F 15/177*    (2006.01)
*G06F 7/00*    (2006.01)
(Continued)

(52) U.S. Cl.
CPC ............ *H04L 65/80* (2013.01); *H04L 41/145* (2013.01); *H04L 41/22* (2013.01);
(Continued)

(58) Field of Classification Search
CPC .... H04L 43/50; H04L 63/1408; H04W 16/22; H04W 40/02; H04W 8/26; H04W 27/08
See application file for complete search history.

(56) References Cited

U.S. PATENT DOCUMENTS

| 6,855,058 B2 | 2/2005 | Kubota et al. |
| 7,401,150 B2 | 7/2008 | Shea et al. |
| (Continued) | | |

FOREIGN PATENT DOCUMENTS

| CN | 101068258 A | 11/2007 |
| CN | 106328855 A | 1/2017 |
| (Continued) | | |

OTHER PUBLICATIONS

Google LLC, International Search Report and Written Opinion, PCT/US2018/066844, dated Feb. 26, 2019, 10 pgs.
(Continued)

*Primary Examiner* — Nicholas R Taylor
*Assistant Examiner* — Ho T Shiu

(57) ABSTRACT

A method performed at an electronic device includes: executing an application; establishing a session between the executing application, a remote server associated with the application, and a media device that transmits output from the session to an output device, wherein the output from the session includes output from the executing application; and presenting to users of one or more second electronic devices on which the application is not executing and/or installed a session identifier associated with the session, wherein the session identifier facilitates joining of the session by the second electronic devices and identifies a controller configuration implementable on each of the one or more second electronic devices for enabling the users of the one or more second electronic devices to interact with the session.

17 Claims, 14 Drawing Sheets

(51) Int. Cl.
  *G06F 9/44* (2018.01)
  *H04L 29/06* (2006.01)
  *H04L 12/26* (2006.01)
  *H04L 12/24* (2006.01)
  *H04W 16/22* (2009.01)
  *H04W 24/06* (2009.01)

(52) U.S. Cl.
  CPC .......... *H04L 43/0829* (2013.01); *H04L 43/50* (2013.01); *H04L 65/607* (2013.01); *H04L 43/045* (2013.01); *H04L 43/08* (2013.01); *H04W 16/22* (2013.01); *H04W 24/06* (2013.01)

(56) References Cited

U.S. PATENT DOCUMENTS

| | | | |
|---|---|---|---|
| 7,774,440 B1 * | 8/2010 | Bagrodia | H04L 41/0823 709/221 |
| 8,171,145 B2 | 5/2012 | Allen et al. | |
| 8,619,588 B2 * | 12/2013 | Karacali-Akyamac | H04L 43/50 370/241 |
| 8,621,585 B2 | 12/2013 | Danieli et al. | |
| 8,641,531 B2 | 2/2014 | Patil | |
| 9,208,642 B2 | 12/2015 | Merari | |
| 9,339,733 B2 | 5/2016 | Boudville | |
| 9,393,486 B2 | 7/2016 | George | |
| 9,396,702 B2 | 7/2016 | Colenbrander | |
| 9,498,711 B2 | 11/2016 | Assa | |
| 9,526,989 B2 | 12/2016 | Oh | |
| 9,592,446 B2 | 3/2017 | Bono et al. | |
| 9,675,874 B1 | 6/2017 | Park | |
| 9,912,562 B2 | 3/2018 | Callahan et al. | |
| 10,166,471 B2 | 1/2019 | Vincent et al. | |
| 10,255,765 B2 | 4/2019 | Washington et al. | |
| 10,456,672 B2 | 10/2019 | Champy | |
| 10,486,066 B2 | 11/2019 | Perry et al. | |
| 2004/0198403 A1 | 10/2004 | Pedersen et al. | |
| 2005/0074063 A1 | 4/2005 | Nair et al. | |
| 2006/0154710 A1 | 7/2006 | Serafat | |
| 2006/0287096 A1 | 12/2006 | O'Kelley et al. | |
| 2006/0287099 A1 | 12/2006 | Shaw et al. | |
| 2007/0018980 A1 | 1/2007 | Berteig et al. | |
| 2007/0203768 A1 * | 8/2007 | Adra | G01S 13/878 340/539.13 |
| 2007/0293319 A1 | 12/2007 | Stamper et al. | |
| 2008/0220878 A1 | 9/2008 | Michaelis | |
| 2009/0008404 A1 | 1/2009 | Kim et al. | |
| 2009/0125961 A1 | 5/2009 | Perlman et al. | |
| 2009/0271656 A1 | 10/2009 | Yokota et al. | |
| 2010/0167809 A1 | 7/2010 | Perlman et al. | |
| 2010/0203952 A1 | 8/2010 | Zalewski | |
| 2010/0306813 A1 | 12/2010 | Perry et al. | |
| 2011/0124417 A1 | 5/2011 | Baynes et al. | |
| 2011/0145635 A1 | 6/2011 | Buckler et al. | |
| 2012/0004042 A1 | 1/2012 | Perry et al. | |
| 2012/0079080 A1 | 3/2012 | Pishevar | |
| 2012/0209571 A1 | 8/2012 | Peterson et al. | |
| 2012/0270644 A1 | 10/2012 | Buhr | |
| 2012/0306877 A1 | 12/2012 | Rosasco | |
| 2013/0017443 A1 | 1/2013 | Yamazaki | |
| 2013/0034160 A1 | 2/2013 | Schmit | |
| 2013/0198642 A1 | 8/2013 | Carney et al. | |
| 2013/0221923 A1 | 8/2013 | Robertson | |
| 2013/0274000 A1 | 10/2013 | Novotny et al. | |
| 2014/0006517 A1 | 1/2014 | Hsiao et al. | |
| 2014/0019582 A1 | 1/2014 | Kim | |
| 2014/0032670 A1 | 1/2014 | Ellingson et al. | |
| 2014/0043333 A1 | 2/2014 | Narayanan et al. | |
| 2014/0179426 A1 | 6/2014 | Perry et al. | |
| 2014/0179434 A1 | 6/2014 | Xu | |
| 2014/0221087 A1 | 8/2014 | Huang et al. | |
| 2014/0274380 A1 | 9/2014 | Kazama | |
| 2014/0274384 A1 | 9/2014 | Boswell et al. | |
| 2014/0342819 A1 | 11/2014 | Bruno, Jr. et al. | |
| 2015/0009222 A1 | 1/2015 | Diard et al. | |
| 2015/0024842 A1 | 1/2015 | Imai et al. | |
| 2015/0087414 A1 | 3/2015 | Chen et al. | |
| 2015/0109185 A1 | 4/2015 | Shimamura et al. | |
| 2015/0297998 A1 | 10/2015 | Karamfilov et al. | |
| 2016/0001184 A1 | 1/2016 | Sepulveda et al. | |
| 2016/0028854 A1 * | 1/2016 | Leeb | H04W 24/06 709/203 |
| 2016/0171757 A1 | 6/2016 | Panneer et al. | |
| 2016/0279523 A1 | 9/2016 | Altagar et al. | |
| 2016/0293134 A1 | 10/2016 | Fortin | |
| 2016/0317921 A1 | 11/2016 | Schmitz et al. | |
| 2017/0034234 A1 | 2/2017 | Zimring et al. | |
| 2017/0083396 A1 | 3/2017 | Bishop et al. | |
| 2017/0097816 A1 | 4/2017 | Joshi | |
| 2017/0124812 A1 | 5/2017 | Washington et al. | |
| 2017/0142201 A1 | 5/2017 | Holmes | |
| 2017/0185464 A1 | 6/2017 | Lipinski et al. | |
| 2017/0246544 A1 | 8/2017 | Agarwal et al. | |
| 2017/0354878 A1 | 12/2017 | Posin | |
| 2017/0354893 A1 | 12/2017 | Benedetto et al. | |
| 2018/0176282 A1 | 6/2018 | Benguerah | |
| 2018/0229128 A1 | 8/2018 | Chandrasekaran et al. | |
| 2018/0250591 A1 | 9/2018 | Prado Rojas et al. | |
| 2018/0256981 A1 | 9/2018 | Enomoto | |
| 2019/0272707 A1 | 9/2019 | Washington et al. | |
| 2019/0308099 A1 | 10/2019 | Lalonde et al. | |
| 2019/0321725 A1 | 10/2019 | Zimring et al. | |
| 2019/0321727 A1 | 10/2019 | Rodgers | |
| 2019/0321732 A1 | 10/2019 | Zimring et al. | |
| 2020/0001177 A1 | 1/2020 | Champy | |
| 2020/0111317 A1 | 4/2020 | Oberberger et al. | |

FOREIGN PATENT DOCUMENTS

| | | |
|---|---|---|
| CN | 107050858 A | 8/2017 |
| CN | 107666943 A | 2/2018 |
| EP | 1374959 A2 | 1/2004 |
| EP | 2546811 A1 | 1/2013 |
| EP | 3610933 A1 | 2/2020 |
| GB | 2525437 A | 10/2015 |
| JP | 2014130589 A | 7/2014 |
| JP | 2015139565 A | 8/2015 |
| KR | 20070082395 | 8/2007 |
| WO | 2005010680 A2 | 2/2005 |
| WO | 2007044908 A2 | 4/2007 |
| WO | 2008104221 A1 | 4/2008 |
| WO | 2012161102 A1 | 11/2012 |
| WO | 2012170437 A1 | 12/2012 |
| WO | 2014085717 A1 | 6/2014 |
| WO | 2014120369 A1 | 8/2014 |
| WO | 2014186858 A1 | 11/2014 |
| WO | 2015191965 A2 | 12/2015 |
| WO | 2016183253 A1 | 11/2016 |
| WO | 2017007659 A1 | 1/2017 |
| WO | 2017201472 A1 | 11/2017 |
| WO | 2019074952 A2 | 4/2019 |
| WO | 2019182752 A1 | 9/2019 |
| WO | 2019195300 A2 | 10/2019 |
| WO | 2020102493 A1 | 5/2020 |

OTHER PUBLICATIONS

A Dynamic Network Scenario Emulation Tool, Daniel Herrscher, Kurt Rothermel University of Stuttgart, Institute of Parallel and Distributed High-Performance Systems (IPVR) Breitwiesenstr. pp. 20-22, 70565 Stuttgart, Germany.
Trace-Based Mobile Network Emulation Brian D. Noble, M. Satyanarayanan, Giao T. Nguyen, Randy H. Katz to appear in Proceedings of ACM SIGCOMM '97, Cannes, France, Sep. 1997.
Extended European Search Report dated Jan. 3, 2020 for EP Application No. EP 19199853.3, 10 pages.
Notice of Grant dated Nov. 5, 2019 for JP Application No. JP 2019220516, 7 pages. English machine translation included.
English Translation of Korean Notice of Allowance dated Jan. 28, 2020 for KR Application No. KR 10-2018-7023961, 3 pages.

(56) References Cited

OTHER PUBLICATIONS

English Translation of Korean Office Action dated Apr. 15, 2019 for KR Application No. KR 10-2018-7023961, 2 pages.
English Translation of Korean Office Action dated Aug. 18, 2018 for KR Application No. KR 10-2020-7002403, 5 pages.
International Preliminary Report on Patentability dated May 9, 2018 for International Application No. PCT/US2017/033642, 13 pages.
International Search Report and Written Opinion dated Apr. 24, 2018 for International Application No. PCT/US2017/033642, 28 pages.
First Action Interview Office Action Summary dated Feb. 26, 2019 for U.S. Appl. No. 15/599,408, 3 pages.
First Action Interview Pilot Program Pre-Interview Communication dated Jan. 8, 2019 for U.S. Appl. No. 15/599,408, 4 pages.
Notice of Allowance dated Jun. 19, 2019 for U.S. Appl. No. 15/599,408, 6 pages.
Non-Final Office Action dated Jun. 12, 2020 for U.S. Appl. No. 16/566,607, 23 pages.
Final Office Action dated Oct. 16, 2020 for U.S. Appl. No. 16/566,607, 18 pages.
International Search Report and Written Opinion dated Feb. 26, 2019 for International Application No. PCT/US2018/066844, 13 pages.
International Search Report and Written Opinion dated Feb. 24, 2020 for International Application No. PCT/US2019/061407, 13 pages.
International Preliminary Report on Patentability dated Apr. 14, 2020 for International Application No. PCT/US2018/055055, 13 pages.
International Search Report and Written Opinion dated Apr. 26, 2019 for International Application No. PCT/US2018/055055, 21 pages.
International Search Report and Written Opinion dated Oct. 4, 2019 for International Application No. PCT/US2019/025182, 23 pages.
International Preliminary Report on Patentability dated Oct. 15, 2020 for International Application No. PCT/US2019/025182, 18 pages.
First Action Interview Pilot Program Pre-Interview Communication dated Apr. 9, 2020 for U.S. Appl. No. 16/368,801, 4 pages.
Notice of Allowance dated Jun. 10, 2020 for U.S. Appl. No. 16/368,801, 12 pages.
International Search Report and Written Opinion dated Jun. 18, 2019 for International Application No. PCT/US2019/025185, 11 pages.
International Preliminary Report on Patentability dated Oct. 15, 2020 for International Application No. PCT/US2019/025185, 7 pages.
Notice of Allowance dated May 5, 2020 for U.S. Appl. No. 16/368,806, 8 pages.
International Search Report and Written Opinion dated Jun. 18, 2019 for International Application No. PCT/US2019/022472, 13 pages.
International Preliminary Report on Patentability dated Oct. 15, 2020 for International Application No. PCT/US2019/022472, 8 pages.
Non-Final Office Action dated Jun. 22, 2020 for U.S. Appl. No. 16/373,558, 6 pages.
Notice of Allowance dated Sep. 17, 2020 for U.S. Appl. No. 16/373,558, 9 pages.
International Search Report and Written Opinion dated Sep. 20, 2019 for International Application No. PCT/US2019/026611, 26 pages.
First Action Interview Pilot Program Pre-Interview Communication dated May 21, 2020 for U.S. Appl. No. 16/380,831, 4 pages.
First Action Interview Office Action dated Sep. 2, 2020 for U.S. Appl. No. 16/380,831, 4 pages.
International Search Report and Written Opinion dated Aug. 1, 2019 for International Application No. PCT/US2019/020935, 23 pages.
International Search Report and Written Opinion dated Oct. 7, 2019 for International Application No. PCT/US2019/025400, 13 pages.
Bernier, Yahn W., "Latency Compensating Methods in Client/Server In-game Protocol Design and Optimization", Game Developers Conference Proceedings, Mar. 20, 2001, 13 pages.
Ra-Qin, "Ra-Qin Review of the Activision Decathlon—Gamespot," Sep. 2, 2006; XP055625157; retrieved from www.gamespot.com/the-activision-decathlon/user-reviews/2200-128501/ on Sep. 23, 2019; 3 pages.
SLIVAR, Ivan et al., "Empirical QoE Study of In-Home Streaming of Online Games", 2014 13th Annual Workshop on Network and Systems Support for Games, IEEE, Dec. 4, 2014, 6 pages.
Yoneda, Satoshi, "Completed Understanding of Windows 8 as a Game Environment (6) Windows Store App Version Game and Xbox Smart Glass," Oct. 30, 2012; 22 pages; accessed on Aug. 5, 2020 from https://www.4gamer.net/games/126/G012689/20121029010/.
Notice of Allowance dated Dec. 30, 2020 for U.S. Appl. No. 16/380,831, 72 pages.
Non-Final Office Action dated Mar. 31, 2021 for U.S. Appl. No. 16/566,607, 19 pages.
Office Action dated Feb. 19, 2021 for European Patent Application No. 18797260.9, 6 pages.
Yadav, Himanshu, et al., "Adaptive GPU Resource Scheduling on Virtualized Servers in Cloud Gaming", Conference on Information and Communication Technology, Nov. 2017, 6 pages.
First Examination Report dated Jun. 26, 2021 for Indian Application No. 202047027952, 6 pages.
English Translation of Japanese Office Action dated May 18, 2021 for JP Application No. 2019-220516, 7 pages.
Extended European Search Report dated May 21, 2021 for EP Application No. EP 21169156.3, 9 pages.
IT Media News, "Google launches new "Chromecast" and "Chromecast Audio" in Japan for JPY4,980"], Feb. 18, 2016, search date Apr. 30, 2021, URL https://www.itmedia.co.jp/news/articles/1602/18/news101.html.
Weekly ASCII, "Angry Birds Friends, a smartphone game to compete for high score with Facebook friends", May 31, 2013, URL https://weekly.ascii.jp/elem/000/002/615/2615748/.
English Translation of Chinese Office Action dated May 21, 2021 for CN Application No. 20198029685.3, 15 pages.

* cited by examiner

NETWORK IMPAIRMENT SIMULATION FRAMEWORK FOR VERIFICATION OF REAL TIME INTERACTIVE MEDIA STREAMING SYSTEMS

RELATED APPLICATIONS

This application is related to U.S. patent application Ser. No. 15/599,408, titled "Methods and Systems for Facilitating Participation in a Game Session," filed May 18, 2017, which is incorporated by reference herein in its entirety.

TECHNICAL FIELD

This application relates generally to computer technology, including but not limited to methods and systems for simulating network impairments for testing network-enabled applications.

BACKGROUND

Streaming media systems have evolved techniques for addressing network impairments caused by congestion, physics, and various physical layer protocol idiosyncrasies. Examples of such techniques include buffering, dynamic bitrate adaptation, and other congestion management techniques. Real time interactive streaming, for fields such as cloud gaming, introduces various constraints that differ from those caused by streaming for passive consumption. As such, determining the efficacy of congestion management techniques for real time interactive streaming applications is extremely difficult due to the many variables at play, both with the various network impairments as well as the interactive nature of the application.

One technique for testing streaming media systems involves the use of simulated networks. However, not only is it very difficult to accurately simulate real-world communication networks, it is also challenging to design simulations that yield reproducible results.

SUMMARY

The implementations described in this specification are directed to developing real time interactive streaming applications by using a simulated test network embodying dynamic real-world impairments.

In some implementations, a network simulator is presented, governed by a set of simulation scenarios. A traffic generator emulates a real-time encoder with controls for emulating target bitrates, error correction and related variables to create traffic similar to what would be generated by an equivalent real time video encoder. A developer client receives traffic generated from the traffic generator. The traffic traverses the network simulator on its way to the developer client. The developer client participates in a protocol to actively record the traffic. A congestion management algorithm interfaces to the traffic generator, modulating its behavior based on the feedback from the developer client.

The described implementations allow developers of real time streaming applications to predict how a particular application will perform over varying types of real world network conditions. The described implementations have an advantage of providing accurate performance evaluations by reproducing real world network impairments, but with the convenience of a lab environment.

In accordance with some implementations, a method is performed at an electronic device having one or more processors and memory storing one or more programs for execution by the one or more processors. The method includes: obtaining a first network simulation scenario selected from a plurality of predefined network simulation scenarios, each of the network simulation scenarios embodying a specific combination of dynamic network parameters, wherein the dynamic network parameters for a respective predefined simulation scenario are based on measurements of a real world communication environment corresponding to the respective simulation scenario; executing a network-enabled test application; encoding a video stream associated with a plurality of specific operations of the network-enabled test application; simulating transmission of the encoded video stream in a simulated test network for the first network simulation scenario with associated first dynamic network parameters; generating a filtered data stream that reflects simulated real time effects of the simulated test network on transmission of the encoded data stream based on the first dynamic network parameters; and determining a plurality of time-varying quality metrics for the filtered data stream.

In accordance with some implementations, a method is performed at an electronic device having one or more processors and memory storing one or more programs for execution by the one or more processors. The method includes: obtaining a network-enabled test application; displaying, in a first user interface of the computing system, a plurality of affordances associated with a respective one of a plurality of predefined network simulation scenarios, each of the network simulation scenarios embodying a specific combination of dynamic network parameters, wherein the dynamic network parameters for a respective predefined simulation scenario are based on measurements of a real world communication environment corresponding to the respective simulation scenario; receiving a user selection of a first affordance associated with a first network simulation scenario; and in response to the user selection of the first affordance: encoding a video stream associated with a plurality of specific operations of the network-enabled test application; simulating transmission of the encoded video stream in a simulated test network for the first network simulation scenario with associated first dynamic network parameters; determining one or more performance aspects of the network-enabled test application based on a plurality of time-varying quality metrics for the filtered data stream; and associating the one or more performance aspects of the network-enabled test application with the first simulation scenario.

In accordance with some implementations, an electronic device includes one or more processors and memory storing one or more programs to be executed by the one or more processors. The one or more programs include instructions for performing any of the methods described above. In accordance with some implementations, a non-transitory computer-readable storage medium stores one or more programs, the one or more programs include instructions, which, when executed by an electronic device with one or more processors, cause the electronic device to perform any of the methods described above.

BRIEF DESCRIPTION OF THE DRAWINGS

Like reference numerals refer to corresponding parts throughout the drawings.

DESCRIPTION OF IMPLEMENTATIONS

In various implementations described in this application, a testing environment includes a network simulator including a plurality of simulation scenarios. Each simulation scenario embodies a specific combination of dynamic network parameters, and the dynamic network parameters for a respective simulation scenario are based on measurements of a real world communication environment corresponding to the respective simulation scenario. When a network-enabled test application is executed in the test environment, an output data stream from the test application is transmitted through the network simulator, where it is exposed to impairments associated with the dynamic network parameters. A developer client receives the resulting impaired data stream and determines a plurality of time-varying quality metrics for the test application, where the quality metrics are specific to a respective simulation scenario. In this manner, a simulated user experience can be determined based on real world network conditions, in the convenience of a lab environment.

Figure 1:
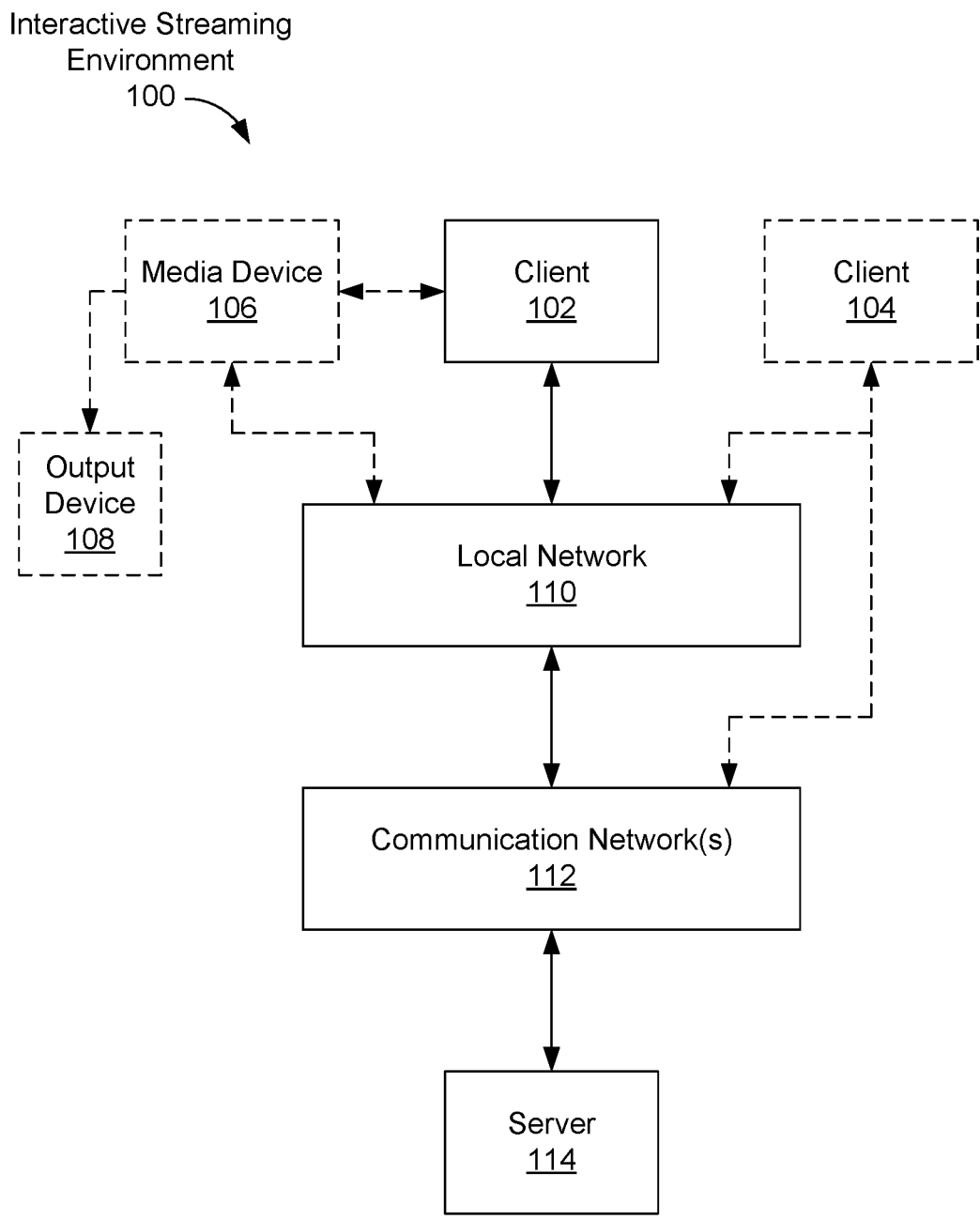
FIG. 1 is a block diagram illustrating an example interactive streaming environment in accordance with some implementations.

FIG. 1 is an example interactive streaming environment 100 in accordance with some implementations. The interactive streaming environment 100 includes a client device 102 and an optional media device 106 on a local network 110. In some implementations, the local network 110 supports wired (e.g., Ethernet) and/or wireless (e.g., Wi-Fi) communications. For example, the local network 110 includes a router device that networks one or more devices into the local network 110. The local network 110 is communicatively coupled to communication networks 112 (e.g., wide-area networks, the internet). Alternatively, the client device 102 and/or media device 106 are communicatively coupled to communications networks 112, without an intermediary local network 110.

In some implementations, the client device 102 and the media device 106 are communicatively coupled. The client device 102 and the media device 106 may communicate with each other through the local network 110 and/or directly (e.g., via Bluetooth or other wireless communications). In some implementations, the client device 102 and the media device 106 are local to each other (e.g., in the same room, in the same house, etc.). The media device 106 is coupled to one or more output devices 108 that output visual and/or audio content (e.g., a television, a display monitor, a sound system, speakers, etc.). In some implementations, the media device 106 is a casting device (e.g., CHROMECAST by Google Inc.) or a device that otherwise includes casting functionality.

The client device 102 is a device that includes, and can run, one or more applications. In some implementations, the client device 102 is a smartphone, tablet device, a laptop or notebook computer, a desktop computer, or a multimedia device.

In some implementations, the client device 102 includes one or more applications that are configured to operate in conjunction with the media device 106. In some implementations, the applications include a media device application for pairing the client device 102 with the media device 106 and configuring the media device 106. The applications also include one or more applications that cast associated content to the media device 106. In some implementations, an application casts data and/or content to the media device 106 by sending the data/content directly to the media device 106 (e.g., via the local network 110) and/or by directing the media device 106 to a remote location (e.g., a Universal Resource Locator ("URL") or other link to a location at a server system) from which the media device 106 can stream or otherwise receive data/content. The media device 106 receives data/content from the application and/or the remote location and outputs visual and/or audio content corresponding to the received data/content to the output device 108.

In the interactive streaming environment 100, a user of the client device 102 (hereinafter "user") starts a streaming session (e.g., a game) by launching a streaming application (e.g., a game application) for execution at the client device 102. The executing streaming application communicates with a server 114 to establish a session. In some implementations, the user instructs the streaming application to communicate with the media device 106 to direct the media device 106 to receive data associated with the streaming session for outputting. For these implementations, a session is established between the streaming application, the remote server 114, and the media device 106.

The user of the client device 102 optionally invites additional users to join the session (e.g., the first player invites other players to join the game). An identifier of the session is presented to users of one or more client devices 104. In some implementations, the session identifier is or otherwise includes an internet link (e.g., a Universal Resource Locator ("URL")) in a notification. If an additional user opens the notification, the user may access the session identifier directly from the notification or activate an affordance to display the session identifier (e.g., in another application). The additional user(s) then join the session upon accessing the session identifier. Specifically, when the session identifier is used at a client 104 (e.g., the session identifier link is activated), the client 104 communicates with the server 114 in order to join the session. After the client 104 joins the session, the users at clients 102 and 104 can participate in the streaming session (e.g., play the game) by, for example, making inputs that affect the output of the session.

In some implementations, if the additional client 104 is already on the local network 110 of the first client 102, communications between the server 114 and the additional client 104 go through the local network 110. If the additional client 104 is not on the local network 110, communications between the server 114 and the additional client 104 go through a different connection (e.g., through communication network(s) 112).

In some implementations, as part of the process of a client 102/104 joining the session, the server 114 accesses the capabilities of the client 102/104 and/or a quality of the communicative connection between the server 114 and the client 102/104. In some implementations, the server 114 measures network latency between the client 102/104 and the server 114. If the measured latency is above a threshold and a lower-latency connection is available, the server 114 suggests that the client 102/104 change to the lower latency connection, or invite the user of the client 102/104 to change the client 102/104 to the lower latency connection. For example, if the client 104 is on a cellular wireless connection 112, and the local network 110 is available, the server 114 suggests that the client 104 should connect through the local network 110.

In some implementations, the latency threshold requirements differ between streaming applications. For example, some streaming applications (e.g., action games) are best experienced on lower latency connections, and some other streaming applications (e.g., online board games or card games) are not as demanding with respect to latency, and the server 114 may make connection recommendations in view of these different requirements.

In some implementations, a streaming application requires a companion application associated with the streaming application. For implementations in which the streaming application is a game application, a companion application is a virtual game controller application for controlling gameplay. In some implementations, the server 114 communicates with the client 102/104 to set up a virtual game controller on the player client 102/104. In some implementations, the server 114 assesses whether the client 102/104 has the needed resources for the virtual game controller (e.g., whether the client 102/104 has an application needed to implement the virtual game controller and/or whether the communicative connection between the client 102/104 and the server 114 has a latency that is appropriate for the game session). Depending on the available resources at the client 102/104, the connection quality, and the requirements for the game, the virtual game controller may be implemented differently at the client 102/104 (e.g., for situations in which connection quality is low the virtual game controller is implemented as a streamlined version including fewer features).

In some implementations, the client 102/104 accesses the streaming application and/or the companion application with a webpage-based interface. For example, a virtual game controller interface for a game may be embedded in a webpage, and the webpage is rendered in a web browser on the client 102/104. If a webpage-based controller interface is the controller of choice for the session, the server 114 transmits the control interface webpage to the client 102/104 when the client 102/104 joins the session.

Figure 2:
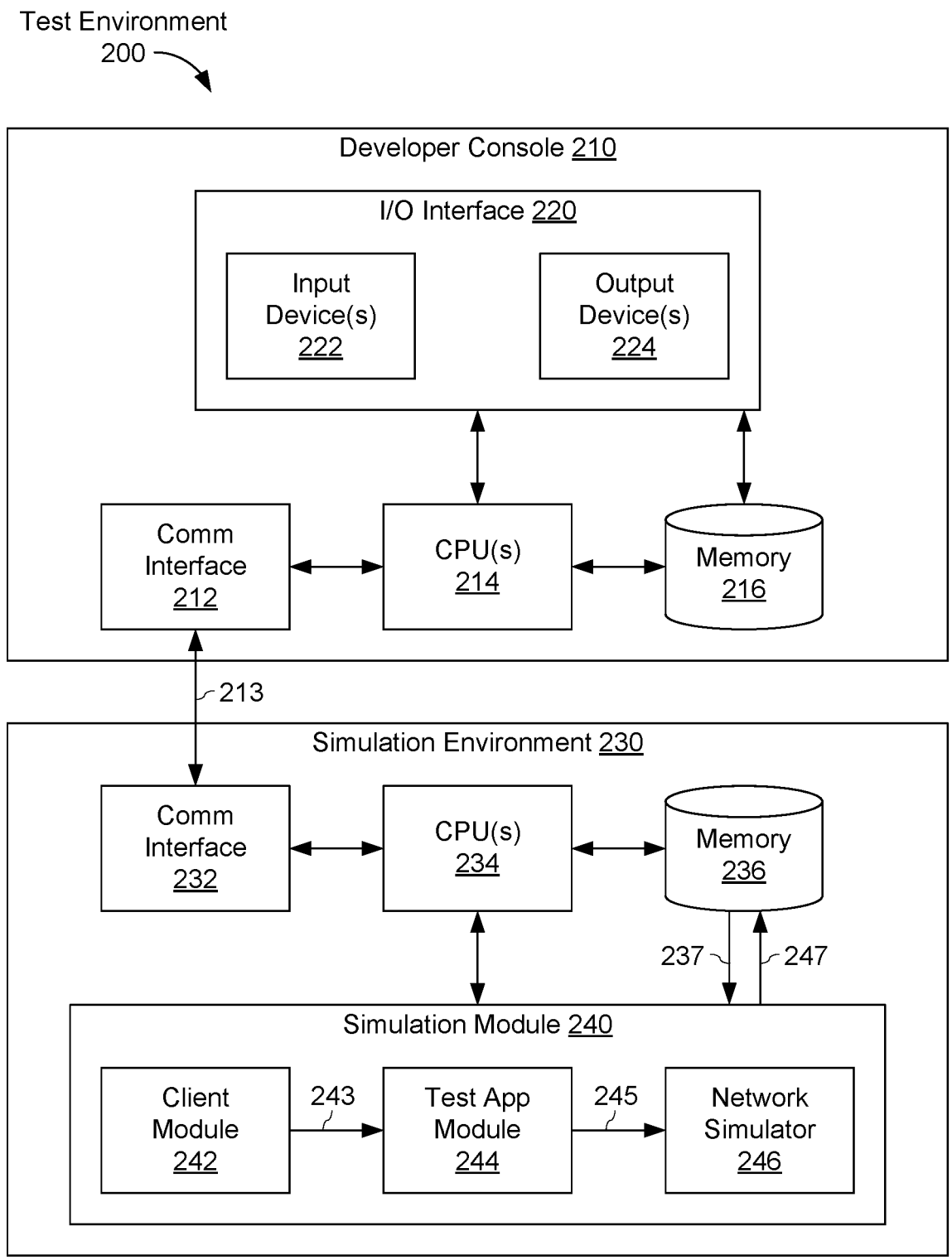
FIG. 2 is a block diagram illustrating an example test environment in accordance with some implementations.

FIG. 2 is a block diagram illustrating an example test environment 200 in accordance with some implementations. The test environment 200 includes a developer console 210 and a simulation environment 230.

In some implementations, the developer console 210 includes an input/output (I/O) interface 220, which includes input device(s) 222 (e.g., a keyboard and/or mouse) and output device(s) 224 (e.g., a display) for facilitating interaction between the developer console 210 and a developer (or any other user of the developer console 210). The developer console 210 further includes memory 216, one or more processors 214 (referred to herein as central processing units (CPUs)), and a communication interface 212 for interfacing with the simulation environment 230 (e.g., through channel 213). In some implementations, the simulation environment 230 includes a communication interface 232 for interfacing with the developer console 210, one or more CPUs 234, memory 236, and a simulation module 240. The simulation module 240 includes a client module 242, a test application ("test app") module 244, and a network simulator 246.

The client module 242 supplies a stream 243 of input data (e.g., simulating input data generated by a user of client device 102, FIG. 1). The input data stream 243 from client module 242 is supplied to the test app module 244, where it affects output data 245 from the application being tested (e.g., session output from server 114, FIG. 1). The output data 245 (e.g., a video stream or an encoded video stream) from the test app module 244 is transmitted through the network simulator 246, where it is subjected to various impairments, as described in more detail below. The impaired output stream 247 from the network simulator is transmitted to the developer console 210 through the communication interfaces 212 and 232, and displayed on an output device 224. In some implementations, CPU 214 derives quality metrics from the impaired output stream 247 and displays the quality metrics on an output device 224. In some implementations, an encoding module (e.g., 434, FIG. 4A) adjusts a congestion management algorithm of the test app based on the quality metrics.

Figure 3:
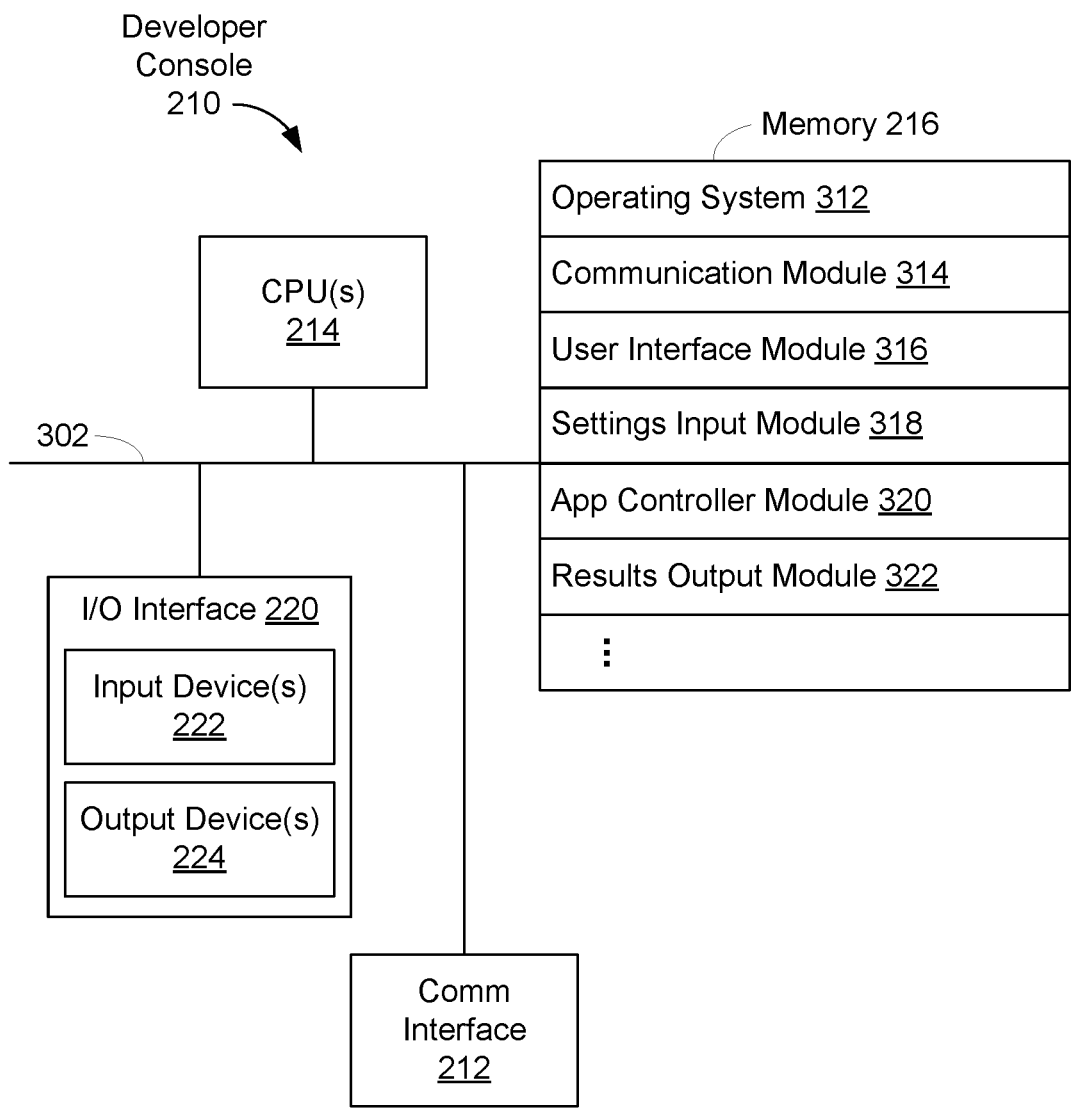
FIG. 3 is a block diagram illustrating an example developer console in accordance with some embodiments.

FIG. 3 is a block diagram illustrating an example developer console 210 in accordance with some implementations. The developer console 210 includes one or more CPUs 214, one or more communication interfaces 212, memory 216, an I/O interface 220, and one or more communication buses 302 for interconnecting these components (sometimes called a chipset). The I/O interface 220 includes one or more input devices 222 (e.g., a keyboard, a mouse, a voice-command input unit or microphone, a touch screen display, a touch-sensitive input pad, a gesture capturing camera, or other input buttons or controls) and one or more output devices 224 (e.g., a visual display which enables presentation of user interfaces and display content), for facilitating interaction between the developer console 210 and a developer (or any other user of the developer console 210). In some implementations, the developer console 210 is implemented as a server that does not have an I/O interface 220, and instead client systems such as a mobile device or other client device (not shown) are used by developers and other people to access simulation data and/or other information stored in the developer console 210 (e.g., in memory 216) and to convey commands to the developer console 210 through the communication interface 212.

Memory 216 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 216, optionally, includes one or more storage devices remotely located from one or more processing units 214. Memory 216, or alternatively the non-volatile memory within memory 216, includes a non-transitory computer readable storage medium. In some implementations, memory 216, or the non-transitory computer readable storage medium of memory 216, stores the following programs, modules, and data structures, or a subset or superset thereof:

Operating system 312 including procedures for handling various basic system services and for performing hardware dependent tasks;

Communication module 314 for connecting the developer console to other devices (e.g., simulation environment 230) via one or more communication interfaces 212 (wired or wireless) and optionally one or more networks, such as the internet, other wide area networks, local area networks, metropolitan area networks, and so on;

User interface module 316 for enabling presentation of information (e.g., a graphical user interface for presenting application(s), widgets, websites and web pages thereof, and/or application content, text, etc.) at the output device(s) 224 of the developer console 210;

Settings input module 318 for prompting (e.g., through an output device 224) and accepting (e.g., through an input device 222) settings for the simulation module 240, including client settings, test app specifications, and simulation scenario settings;

App controller module 320 for facilitating interactions between a developer and a specified companion application (e.g., a virtual game controller) for implementations in which the developer manually controls the test application (e.g., plays the game being tested); and Results output module 322 for determining quality metrics based on the impaired output stream and displaying results based on the quality metrics on an output device 224.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 216, optionally, stores a subset of the modules and data structures identified above. Furthermore, memory 216, optionally, stores additional modules and data structures not described above.

Figure 4A:
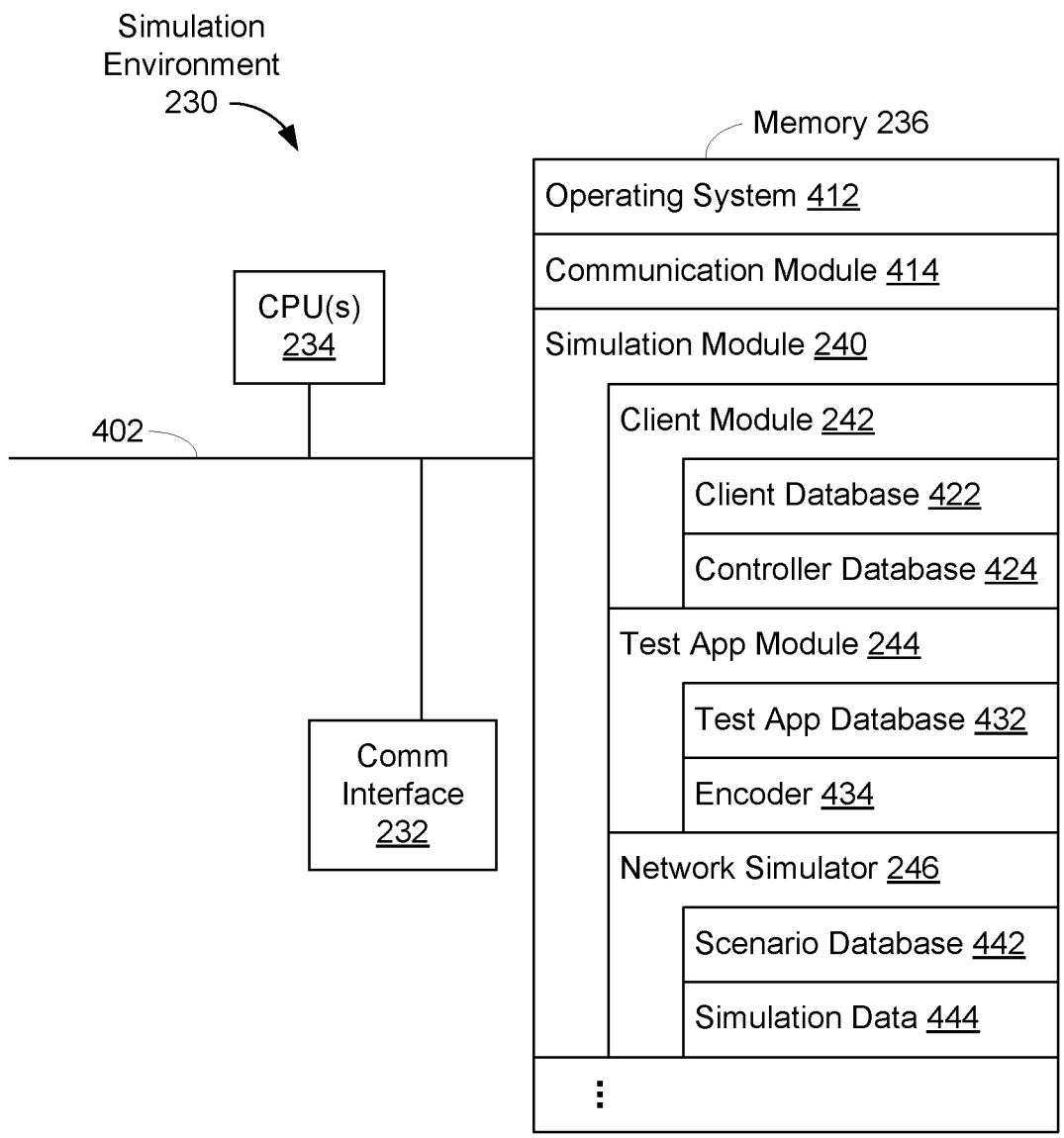
FIGS. 4A-4F are block diagrams illustrating an example simulation environment in accordance with some implementations.
Figure 4B:
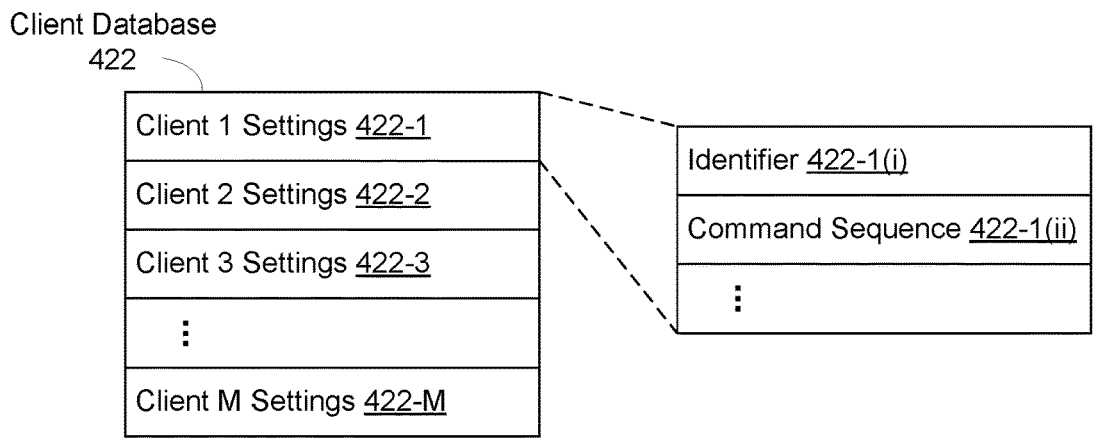
Figure 4C:
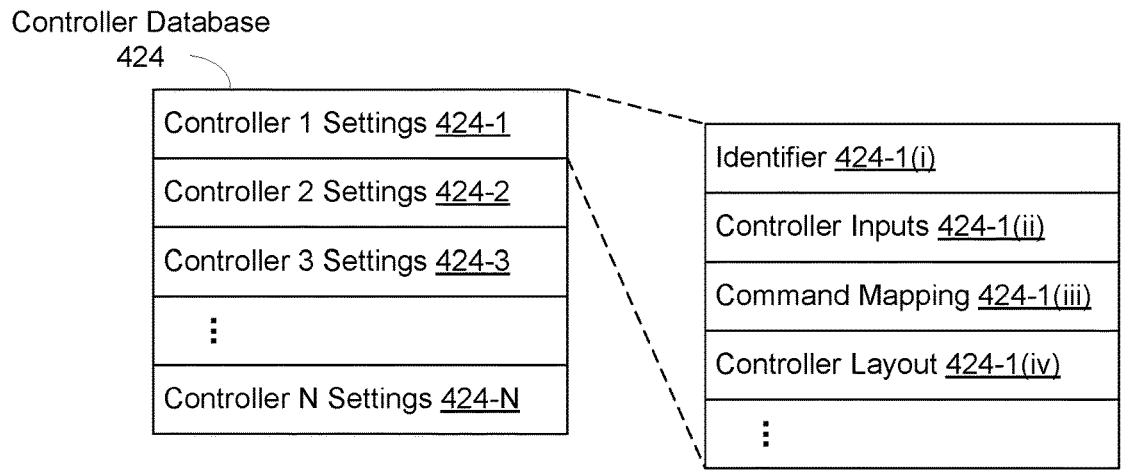

FIG. 4A is a block diagram illustrating an example simulation environment 230 in accordance with some implementations, and FIGS. 4B-4F are block diagrams illustrating contents of various modules in FIG. 4A in accordance with some implementations. The simulation environment 230 includes one or more CPUs 234, one or more communication interfaces 212, memory 236, and one or more communication buses 402 for interconnecting these components (sometimes called a chipset). In some implementations, the simulation environment 230 is implemented as a server.

Memory 236 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 236, optionally, includes one or more storage devices remotely located from one or more processing units 234. Memory 236, or alternatively the non-volatile memory within memory 236, includes a non-transitory computer readable storage medium. In some implementations, memory 236, or the non-transitory computer readable storage medium of memory 236, stores the following programs, modules, and data structures, or a subset or superset thereof:

Operating system 412 including procedures for handling various basic system services and for performing hardware dependent tasks;

Communication module 414 for connecting the simulation environment to other devices (e.g., developer console 210) via one or more communication interfaces 232 (wired or wireless) and optionally one or more networks, such as the internet, other wide area networks, local area networks, metropolitan area networks, and so on;

Simulation module 240 for simulating user input, executing the test application, and simulating network impairments, the simulation module 240 including:

Client module 242 for executing pre-defined user inputs (e.g., entered by a simulated user) or manually entered user inputs (e.g., entered by the developer in the course of manually playing the game or otherwise controlling the test application), the client module 242 including:

a database, table, or other collection 422 of client programs, each client program including particular client settings 422-1 through 422-M (FIG. 4B), where the settings for a particular client program include (i) an identifier of the particular client (e.g., Beginner, Novice, Expert, Custom-1, Custom-2, etc.), and (ii) a particular sequence of commands representing simulated user inputs (e.g., run for w seconds, jump at x timestamp, fire weapon y at direction z at timestamp x+1, and so forth); and a database, table, or other collection 424 of controller or companion programs (e.g., virtual game controller programs as described with reference to FIG. 1), each controller program including particular settings 424-1 through 424-N (FIG. 4C), where the settings for a particular controller or companion program include (i) an identifier of the particular program (e.g., Full Game Controller, Streamlined Game Controller, Media Buttons Set 1, Media Buttons Set 2, etc.), (ii) the inputs for each setting (e.g., joystick, up, down, button A, button B, accelerometer, etc.), (iii) a mapping of inputs to particular commands (e.g., button A is mapped to a jump command, button B is mapped to a fire command, etc.), and (iv) a controller layout (e.g., directional buttons on the left of a user interface, buttons A and B on the right the user interface, etc.);

Test application module 244 for providing server-side functionalities associated with test applications (e.g., game applications), including but not limited to storing application state data (e.g., game state data) and other application-related data, processing inputs (e.g., gameplay inputs) from client module 242, and rendering outputs (e.g., gameplay outputs), referred herein as an output data stream, the test application module 244 including:

a database, table, or other collection 432 of test applications (e.g., games to be tested) that, when run in the simulation environment by CPU(s) 234, are optionally controlled by input commands 422 from the client module 242 in order to produce an output data stream for encoding, each test application including particular settings and data corresponding to the test applications 432-1 through 432-P (FIG. 4D), where the settings and data include: (i) an identifier of the particular test application, (ii) companion/controller settings for implementations in which the test application is configured to be controlled by a particular companion application; and (iii) congestion management algorithms (optionally included in encoding module 434) for adjusting encoder controls to account for varying network capacities; and an encoder 434 with controls for emulating target bitrates, error correction, and related variables to encode the output data stream and transmit the output data stream to the network simulator 246; and Network simulator 246 for simulating real world network impairments (e.g., such as those present in local network 110 and/or communication network(s) 112, FIG. 1) through which the encoded output data stream is transmitted on its way to the developer console 210, the network simulator 246 including:

a database, table, or other collection 442 of simulation scenarios (described in more detail below), each simulation scenario including particular settings and data corresponding to the simulation scenario 442-1 through 442-Q (FIG. 4E), where the settings and data include: (i) an identifier of the particular simulation scenario, (ii) commands associated with particular simulated impairments (e.g., one-way latency, round trip latency, jitter, packet loss, TCP retransmission, etc.), and (iii) a command recipe or sequence for executing the aforementioned commands in a time-based manner (described in more detail below with respect to FIG. 5); and a database, table, or other collection 444 of simulation data (described in more detail below with respect to FIGS. 6C-6D), where the simulation data 444-1 through 444-R (FIG. 4F) represents results of analyses by the CPU(s) 234 for R simulations, where the simulation data includes: (i) scenario data identifying the particular simulation scenario that programmed or selected for the simulation, (ii) client data identifying the particular client program that was selected or the manual inputs that were received for the simulation, (iii) test app data identifying the application that had been tested for the simulation, (iv) the encoded output data stream (the output of test app module 244), (v) the impaired output data stream (the output of network simulator 246), (vi) events, flags, or other results of interest based on the analysis of the impaired data stream for display on an output device 224 (FIGS. 6C-6D), and (vii) a summary of the results of the simulation for display on an output device 224 (FIGS. 6C-6D).

Figure 5A:
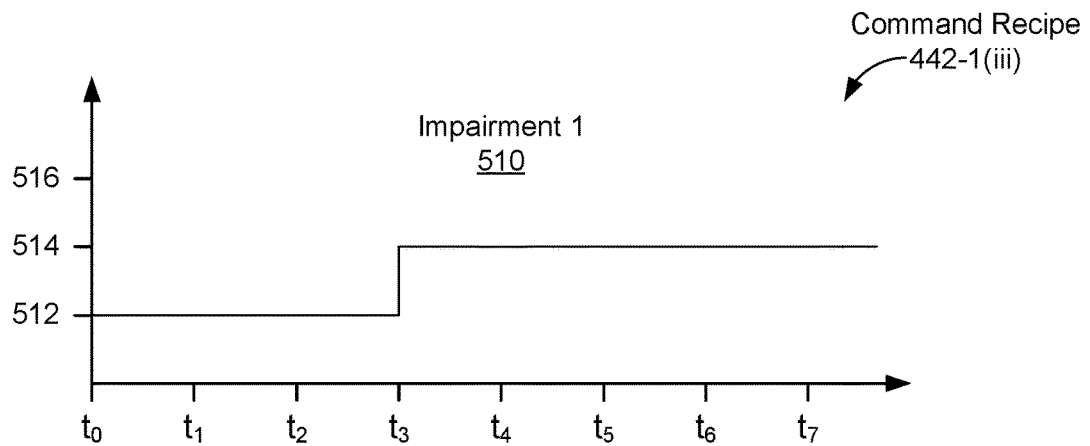
FIGS. 5A-5C are graphs of example network impairments in accordance with some implementations.
Figure 5B:
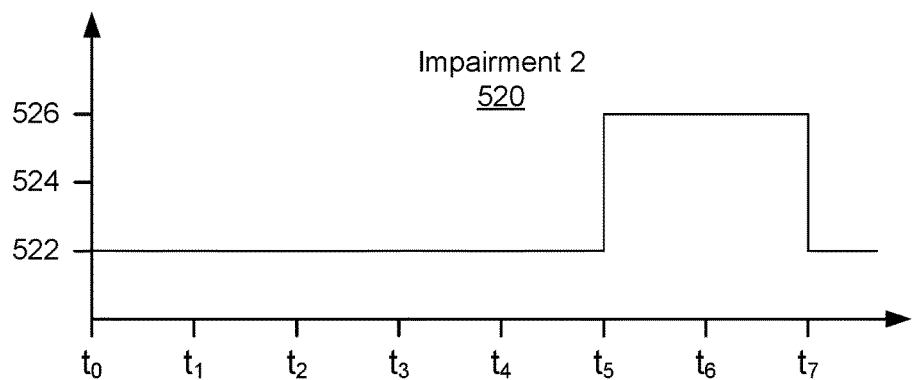
Figure 5C:
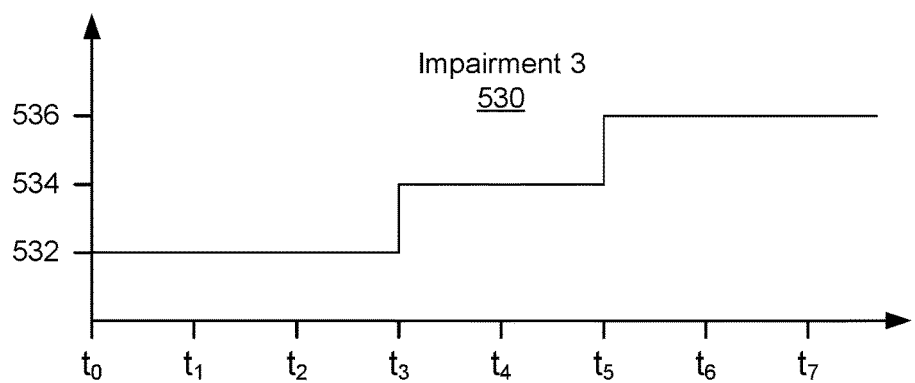

FIGS. 5A-5C are graphs of three impairments in an example command recipe 442-1(*iii*) in accordance with some implementations. Examples of network impairments include, but are not limited to: one-way latency, round trip latency, jitter, packet loss, and TCP retransmission. The example command recipe 442-1(*iii*) includes a first impairment 510, a second impairment 520, and a third impairment 530. The command recipe dynamically varies each impairment over time, with $t_0$ representing an initial time index with respect to a particular simulation (e.g., the beginning of the simulation), and $t_1$ through $t_7$ representing subsequent time indices. At $t_0$, the first impairment 510 is at an initial level 512, the second impairment 520 is at an initial level 522, and the third impairment is at an initial level 532. Stated another way, a data stream transmitted through a network simulator 246 which is programmed to run a simulation scenario characterized by command recipe 442-1(*iii*) will be subjected to at least the three impairments 510, 520, and 530 at initial levels. For example, the data stream may be impaired by an initial level 512 of latency, an initial level 522 of jitter, and an initial level 532 of packet loss. At time $t_3$, impairment 510 changes to an increased level 514, impairment 520 remains at the initial level 522, and impairment 530 changes to an increased level 534. At time $t_5$, impairment 510 remains the same while impairment 520 changes to an increased level 526 and impairment 530 increases again to level 536. At time $t_7$, impairment 520 decreases to the initial level 522 while impairments 510 and 530 remain unchanged. In some implementations, changes in impairment levels take place at a microsecond level. For example, the amount of time between each time index in FIG. 5 (e.g., from $t_0$ to $t_1$, $t_1$ to $t_2$, and so forth) is one microsecond. In some implementations, one or more changes in impairment levels take place in as little as less than a microsecond apart, and in as much as minutes apart.

The various network impairments are modeled off of real world network scenarios. For instance, impairment 510 may result from a person closing a door at time $t_3$, thereby impeding a WiFi signal for as long as the door remains closed; impairment 520 may result from a person turning on a microwave at time $t_5$, thereby impeding a WiFi signal until the microwave turns off at time $t_7$, at which time the impairment introduced by the microwave's interference completely goes away; and impairment 530 may result from a person continuously walking away from a wireless router, thereby experiencing a decreased signal strength. By modeling the various impairments in each simulation scenario to simulate real world network scenarios with real world impairments (as described above), the simulation scenarios more realistically emulate real world environments. Further, by capturing the dynamic impairment changes in a static command recipe, each simulation scenario provides a reproducible sequence of dynamically changing impairments, thereby allowing for repeatable tests and reliable results when comparing different versions of the same test application. In other words, a developer testing an interactive network-enabled application (e.g., a cloud-based game) can be reassured that changes in results between tests are due to updates in the application itself, instead of variations in the testing environment.

FIGS. 6A-6D illustrate example user interfaces in accordance with some implementations. In some implementations, the various user interfaces described herein are configured (e.g., by user interface module 316) to be displayed on an output device 224 of the developer console 210.

Figure 6A:
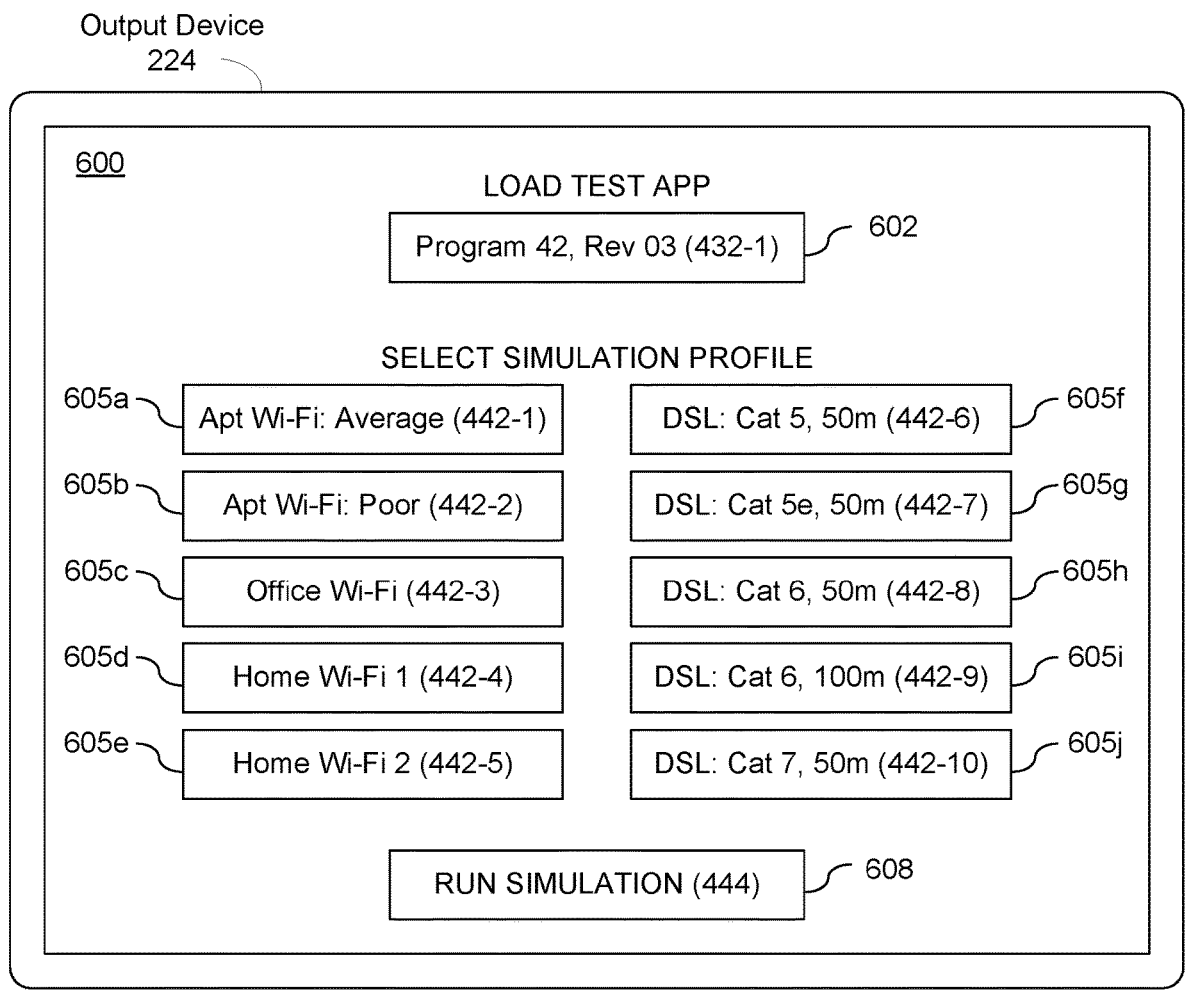
FIGS. 6A-6D illustrate example user interfaces in accordance with some implementations.

FIG. 6A depicts a simulation setup interface 600 which includes an affordance 602 for loading an application (432-1) for testing in the test environment 200, and a plurality of affordances 605a-j for selecting a particular simulation scenario (442-1 through 442-10). Upon selection of a test application and a particular simulation scenario, the user proceeds to run a simulation (444) using affordance 608.

Figure 6B:
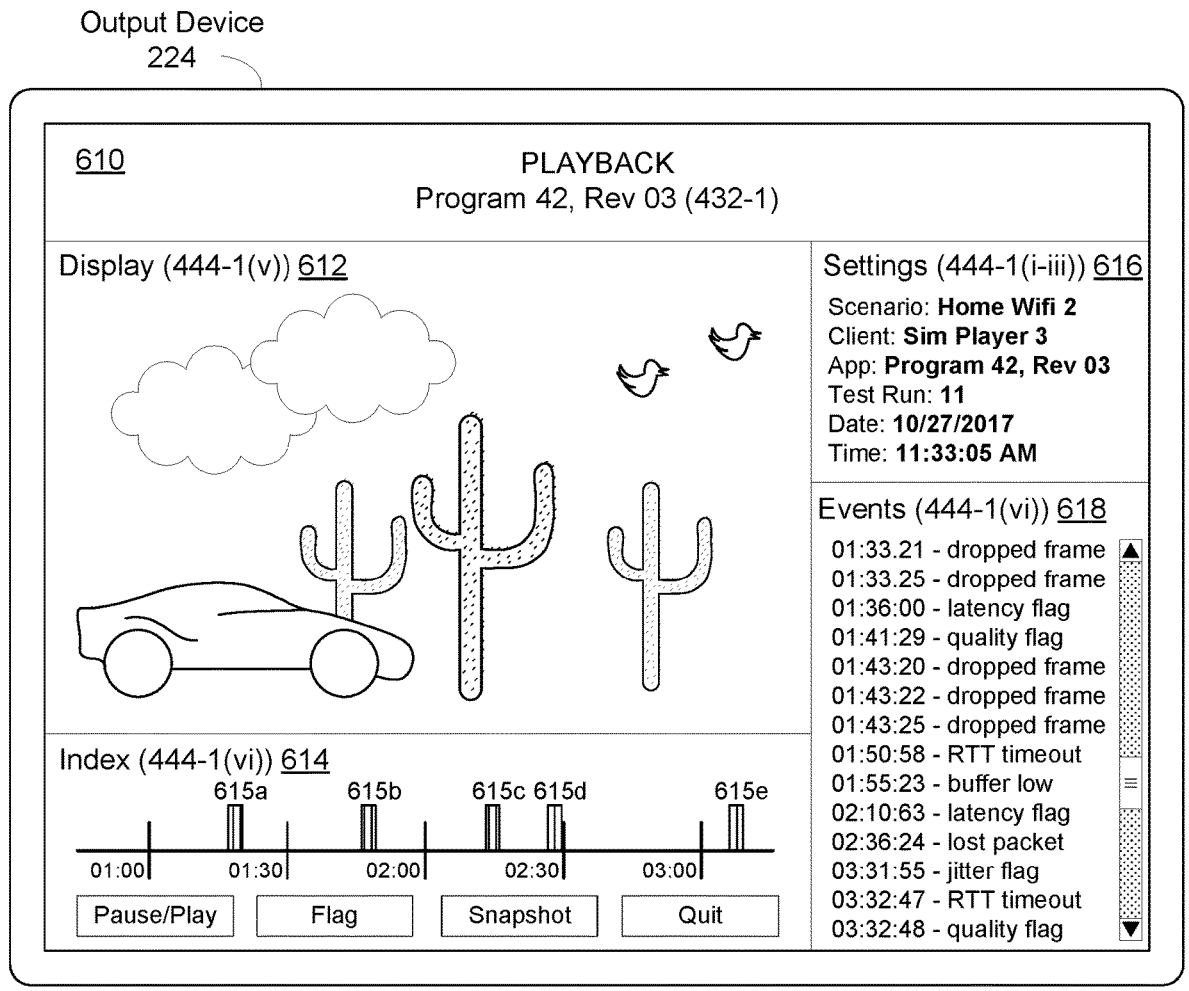
Figure 6C:
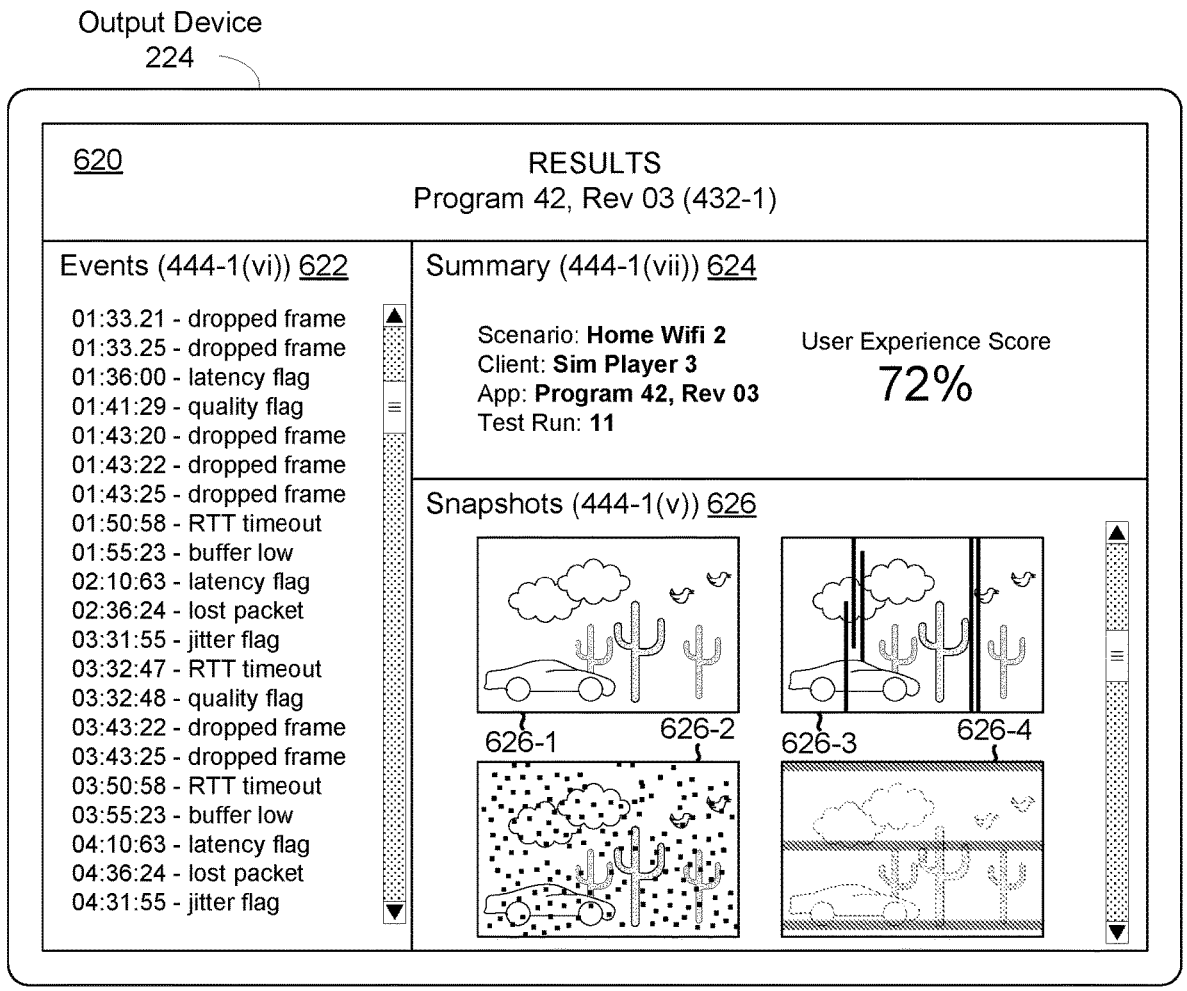
Figure 6D:
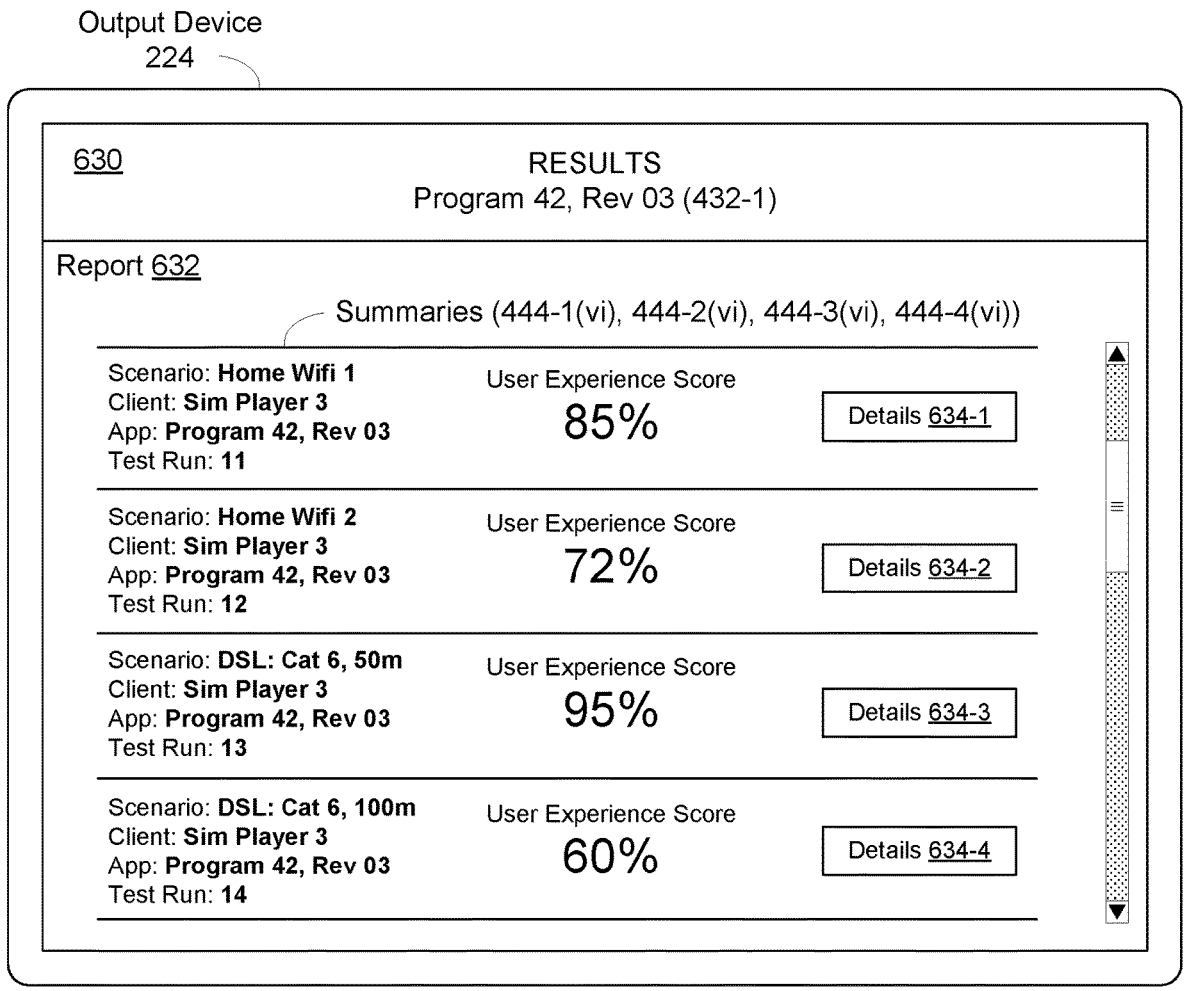

FIG. 6B depicts a playback interface 610 which includes a display area 612 for displaying the impaired data stream (444-1(*v*)) of the test application. In some implementations, interface 610 shows the output data stream while the application is being tested, enabling substantially real time observations by the developer. Also included in interface 610 is a settings area 616 for displaying settings (444-1(*i-iii*)) related to the test application, and index area 614 for displaying a graphical depiction of various flags and/or events 615a-e of interest (444-1(*vi*)) as they relate to a timeline corresponding with the displayed output data stream, and/or an events area 618 for displaying a more comprehensive list of various flags and/or events of interest (444-1(vi)) as they are detected during the simulation.

FIG. 6C depicts a results interface 620 which includes an events area 622 for displaying a list of various flags and/or events of interest (444-1(vi)) that were detected during the simulation, a summary area 624 for displaying a summary (444-1(vii)) of the results from the simulation, and snapshots 626 showing a plurality of image frames or subsets of image frames from the impaired output stream that are representative of respective events 444-1(vi). In some implementations, a reference frame is shown, having no visual artifacts as a result of impairments, in order to facilitate a comparison between an impaired frame and the nonimpaired reference frame. For example, snapshot 626-1 shows an image frame with no artifacts, which may be used as a reference frame. Snapshots 626-2, 626-3, and 626-4, on the other hand, each exhibit artifacts as a result of respective impairments 444-1(vi) from the simulation 432-1.

FIG. 6D depicts a results interface 630 which includes a report area 632 for displaying a plurality of summaries (444-1(vi), 444-2(vi), 444-3(vi), and 444-4(vi)) from a plurality of respective simulations. Each summary includes or is otherwise associated with a details affordance 634 which provides access to a more detailed results interface (e.g., interface 620, FIG. 6C) for each respective simulation.

The various affordances, elements, and areas displayed in the example user interfaces 600, 610, 620, and 630 are merely exemplary; a person of ordinary skill in the art would recognize that the specific means for loading and selecting files and displaying results that are depicted in the figures are not meant to be limiting in the context of interacting with an electronic device in a test environment.

Figure 7:
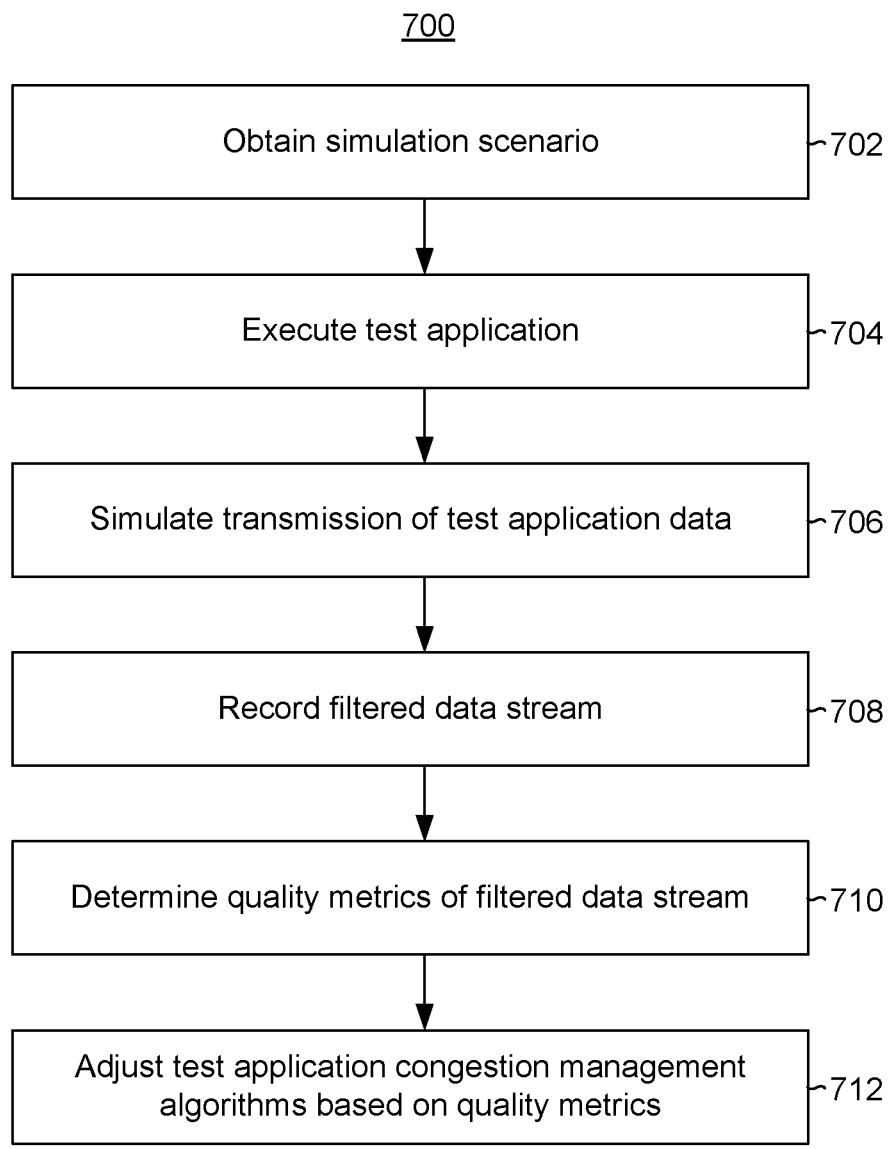
FIG. 7 is a flow diagram illustrating an example method for tracking a simulated user experience in accordance with some implementations.

FIG. 7 is a flow diagram of a method 700 for tracking a simulated user experience in accordance with some implementations. The method 700 may be performed at an electronic device (e.g., developer console 210, simulation environment 230, or a combination thereof) having one or more processors (e.g., CPUs 214 and/or 234) and memory (e.g., memory 216 and/or 236) storing one or more programs for execution by the one or more processors. In some implementations, an electronic device includes one or more programs and memory storing one or more programs for execution by the one or more processors, and the one or more programs include instructions for performing the method 700. In some implementations, a non-transitory computer readable storage medium stores one or more programs, the one or more programs including instructions, which, when executed by an electronic device with one or more processors, causes the electronic device to perform the method 700.

An electronic device (e.g., simulation environment 230, FIG. 2) obtains (702) a first network simulation scenario (e.g., scenario 442-1, FIG. 4E) selected from a plurality of predefined network simulation scenarios. Each of the network simulation scenarios embodies a specific combination of dynamic network parameters (e.g., command recipe 442-1(iii), FIG. 4E), wherein the dynamic network parameters for a respective predefined simulation scenario are based on measurements of a real world communication environment corresponding to the respective simulation scenario. Example scenarios serving as bases for simulations include wired communication channels (e.g., Ethernet, DSL), wireless communication channels (e.g., Wi-Fi) mediums, and combinations thereof. To accurately represent a real-world communications channel, each simulation scenario includes a sequence of impairments, with one or more of the impairments independently changing over time (e.g., impairments 510, 520, and 530, FIG. 5). Examples of impairments include one-way latency, round trip latency, jitter, packet loss, channel noise, channel bandwidth, and TCP retransmission. Each simulation scenario is a representative example of how real-world networks behave when subjected to different impairments. In some implementations, various real-world scenarios include Wi-Fi networks in different real-world environments (e.g., home, apartment, office, airport) and in particular areas in each environment (e.g., bedroom, kitchen, cubicle, break room, restroom, balcony). In some implementations, various real-world scenarios include DSL networks using different standards (e.g., Category 5, 5e, 6, 7, and so forth) and physical characteristics (e.g., cable length, conductor width and geometry). In some implementations, a plurality of simulation scenarios are included in a list of available simulation scenarios (e.g., scenarios 605, FIG. 6A), from which one is selected (e.g., by the developer) in step 702.

Figure 4D:
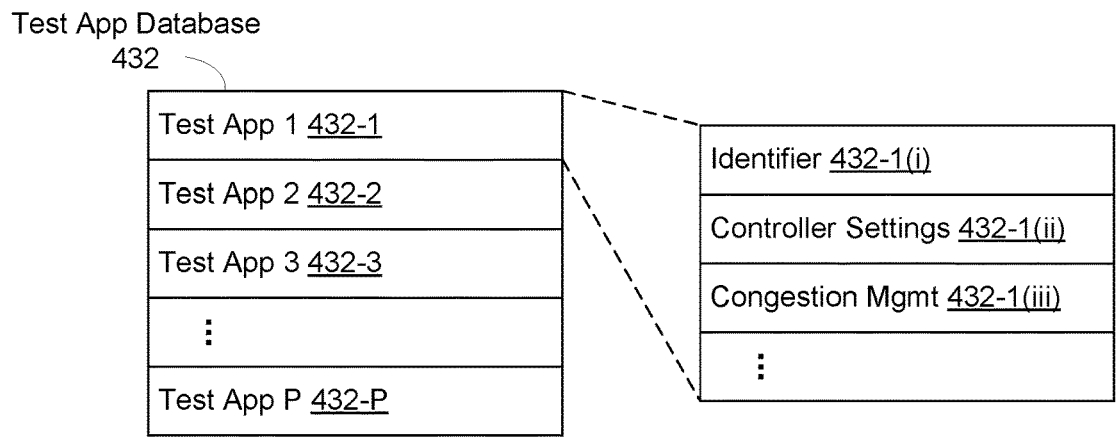

The electronic device executes (704) the test application (e.g., 432-1, FIG. 4D). In some implementations, the test application is a network-enabled application (e.g., a cloud-based application), an interactive application (e.g., a gaming application), or a combination thereof. In some implementations, a client (e.g., 242, FIGS. 2 and 4A) controls the test application with a sequence of command inputs corresponding to a plurality of specific operations of the test application. The sequence of command inputs is either pre-stored in memory (e.g., 422-1(ii), FIG. 4B), or entered manually by the developer by operating a pre-configured virtual controller (e.g., 424-1, FIG. 4C). The test application provides an output data stream based on the inputs received by the client module, or independently of any inputs. In some implementations, an encoder (e.g., 434, FIG. 4A) encodes the output data stream, and the encoded output data stream is transmitted to a network simulator (e.g., 246, FIGS. 2 and 4A).

Figure 4E:
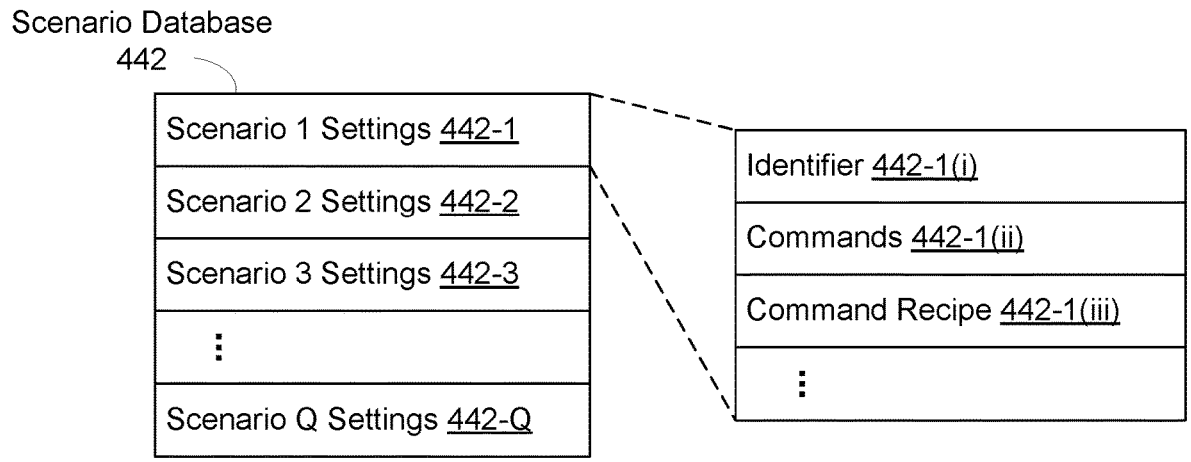

The network simulator simulates (706) transmission of the output data stream, or the encoded output data stream, of the test application in a simulated test network for the first network simulation scenario (e.g., 442-1, FIG. 4E) with associated first dynamic network parameters (e.g., 442-1(iii), FIG. 4E). Stated another way, the output data (245, FIG. 2) is transmitted through a network simulator (246, FIG. 2) which is characterized by impairments corresponding to a particular preconfigured network simulation scenario. In some implementations, the network simulator subjects the output data to impairments by filtering the output data. The resulting filtered data stream reflects simulated real time effects of the simulated test network on transmission of the encoded data stream based on the first dynamic network parameters. Examples of effects of the simulated test network on transmission of the encoded data stream include a specific dropped frame, a specific lost packet, a specific measure of latency, a specific measure of quality, and a specific timeout (e.g., 441-1(vi), FIG. 4F; 618, FIG. 6B).

Figure 4F:
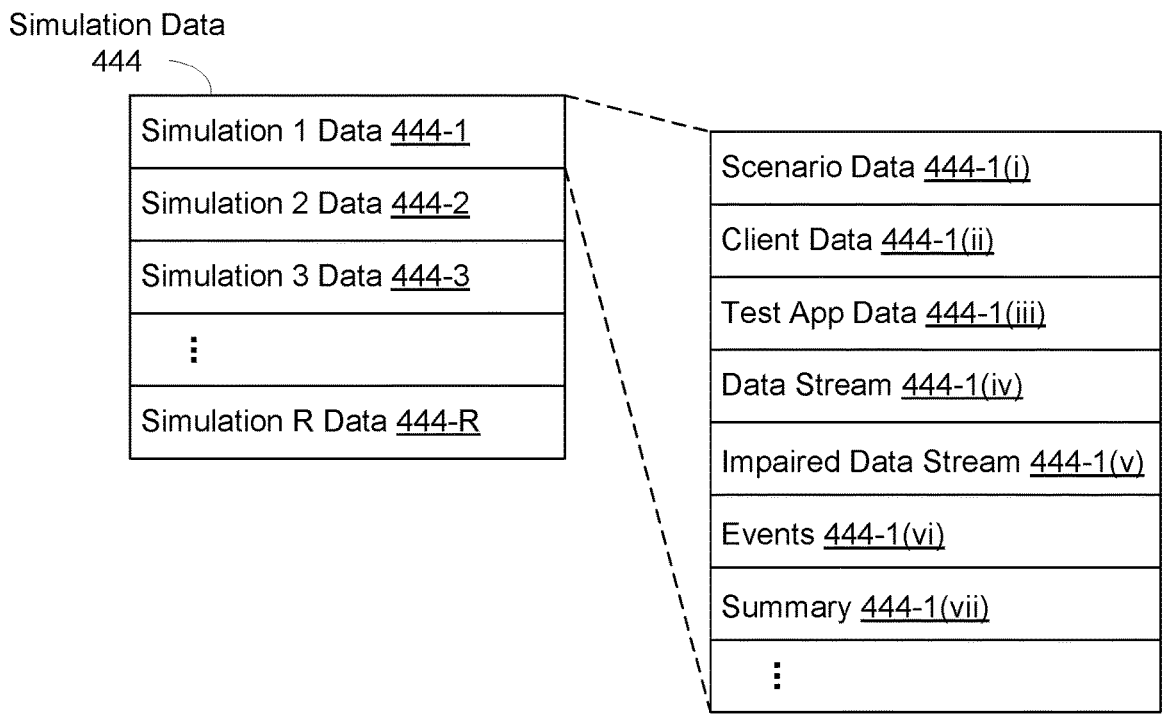

The filtered data stream is recorded (708) in memory (e.g., 444-1(v), FIG. 4F). In some implementations, data corresponding with effects of the impairments on the data stream are also recorded in memory (e.g., 444-1(vi), FIG. 4F). In some implementations, the filtered data stream and/or the data corresponding with effects of the impairments on the data stream are displayed on an output device (e.g., 224, FIG. 2) of the developer console 210. In some implementations, the filtered data stream and/or events associated with the filtered data stream are displayed in real time (or approximate real time) while the test application is still running (e.g., FIG. 6B). In some implementations, the filtered data stream and/or events associated with the filtered data stream are displayed upon termination of the test application (e.g., FIG. 6C).

The electronic device determines (710) one or more time-varying quality metrics for the filtered data stream. Examples of quality metrics include latency measurements, jitter measurements, dropped packets, channel noise levels, and channel bandwidth levels. In some implementations, the quality metrics are determined with respect to running time of the test application, or with respect to specific portions of the test application. In some implementations, one or more performance aspects of the test application are determined based on the quality metrics (e.g., percentage of dropped packets, average/high/low latency and/or bandwidth levels, and so forth). In some implementations, a simulated user experience value is determined and associated with the simulation scenario for the test application (e.g., "User Experience Score" in Summary 624, FIG. 6C). In some implementations, the simulated user experience value is determined by deriving one or more simulated quality of service (QoS) values from the plurality of quality metrics, and comparing the one or more simulated QoS values with and one or more target QoS values. For example, CPU 214 derives a simulated QoS value from a percentage of time windows during which the impaired data stream exhibits a threshold percentage of dropped packets, and the simulated QoS value (e.g., 70% packet drop rate) is compared to a target QoS value (e.g., 5% packet drop rate). If the simulated QoS value fails to meet the target QoS value, this is reflected as a factor in the overall user experience calculation. Other thresholds, factors, and weighted combinations of factors are possible depending on user/developer preference. For example, depending on how much a gaming application depends on low latency for an adequate user experience, a target latency-based QoS may be relatively more stringent than that of an application in which latency is less of an issue. In some implementations, one or more renderings of the filtered data stream are displayed (e.g., 612, FIG. 6B; 626, FIG. 6C) and the user experience value is determined based on a quality aspect of the displayed renderings.

In some embodiments, the electronic device adjusts (712) one or more congestion management algorithms (e.g., 432-1(*iii*), FIG. 4D) of the test application based on one or more quality metrics. For example, if the simulated QoS is below the target QoS, a bitrate of the encoder is adjusted to compensate.

Figure 8:
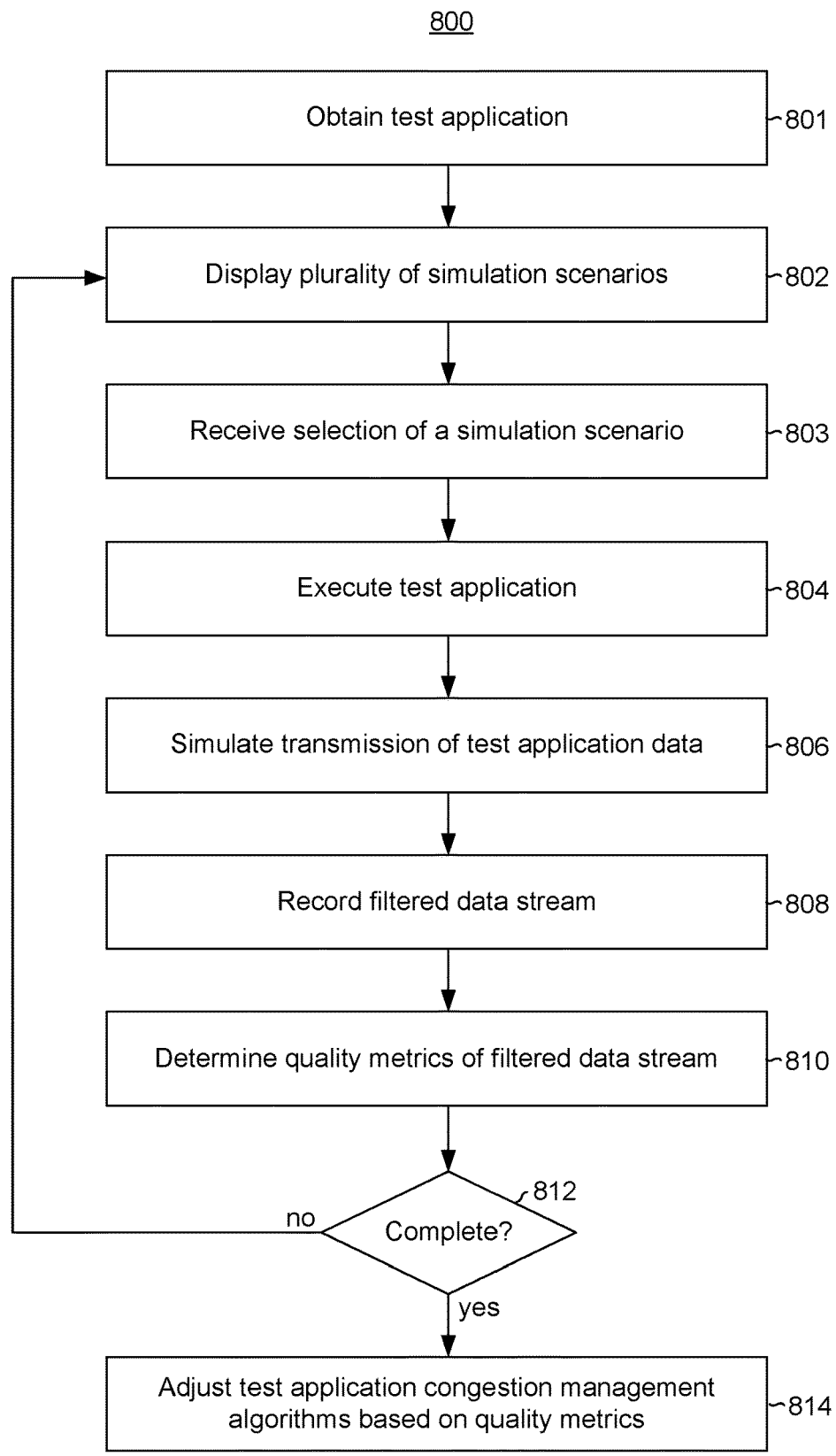
FIG. 8 is a flow diagram illustrating an example method for tracking a simulated user experience in accordance with some implementations.

FIG. 8 is a flow diagram of a method 800 for tracking a simulated user experience in accordance with some implementations. The method 800 may be performed at an electronic device (e.g., developer console 210, simulation environment 230, or a combination thereof) having one or more processors (e.g., CPUs 214 and/or 234) and memory (e.g., memory 216 and/or 236) storing one or more programs for execution by the one or more processors. In some implementations, an electronic device includes one or more programs and memory storing one or more programs for execution by the one or more processors, and the one or more programs include instructions for performing the method 800. In some implementations, a non-transitory computer readable storage medium stores one or more programs, the one or more programs including instructions, which, when executed by an electronic device with one or more processors, causes the electronic device to perform the method 800.

An electronic device (e.g., developer console 210, FIG. 2) obtains (801) a test application (e.g., a network-enabled test application 432-1, FIG. 4D). In some implementations, the test application is obtained when a developer loads or selects the test application using a user interface element (e.g., 602, FIG. 6A) of the developer console. In some implementations, upon selection of a test application, the CPU 234 loads the selected test application from the memory 236 into the test application module 244 (FIG. 2).

The electronic device displays (802) a plurality of simulation scenarios (e.g., 442, FIG. 4E). In some implementations, the simulation scenarios are displayed in a plurality of affordances (e.g., 605, FIG. 6A) in the same user interface as that in step 801, or in a different user interface. In some implementations, only one simulation scenario is displayed at a time. As described above, each of the simulation scenarios embodies a specific combination of dynamic network parameters (e.g., 442-1(*iii*), FIG. 4E), and the dynamic network parameters for each simulation scenario are based on measurements of respective real world communication environments corresponding to the respective simulation scenarios.

The electronic device receives (803) a selection of a first simulation scenario (e.g., through selection of an affordance 605). In some implementations, a developer selects an available simulation scenario by selecting an affordance or other user interface element that corresponds to a desired simulation scenario for a particular test. Alternatively, a simulation scenario is automatically selected as part of a testing script. For example, a particular testing script may be associated with DSL testing, and include simulation scenarios 442-6 through 442-10 (FIG. 6A). Upon selection of the DSL testing script, the first scenario (442-6) is automatically selected and the simulation is run. Subsequently, the next scenario (442-7) is automatically selected and the simulation is run again. In some implementations, upon any kind of selection (e.g., manual or automatic) of a simulation scenario, the CPU 234 loads the selected simulation scenario from the memory 236 into the network simulator 246 (FIG. 2).

In some implementations, the electronic device also receives a selection of a client program or script (e.g., 422, FIG. 4B) for automatic control of the test application and/or controller program or script (e.g., 424, FIG. 4C) for manual control of the test application. In some implementations, a developer selects an available client and/or controller program by selecting an affordance or other user interface element that corresponds to the desired client and/or controller program on the same user interface as that in steps 801 and/or 802, or on a different user interface. In some implementations, upon selection of a client program, the CPU 234 loads the selected client program from the memory 236 into the client module 246 (FIG. 2).

Upon selection of a test application and a simulation scenario (and optionally, a client program), the electronic device runs a simulation. In some implementations, the simulation is run upon selection of an affordance (e.g., 608, FIG. 6A) or other user interface element associated with starting a simulation, on the same user interface as that in steps 801 and/or 802, or on a different user interface.

In order to run a simulation, the electronic device executes (804) the test application. Upon execution of the test application, an encoder (e.g., 434, FIG. 4A) associated with the test application or the test application module encodes a data stream (e.g., a video stream) associated with a plurality of specific operations of the network-enabled test application, the operations being entered manually by a developer operating a controller (e.g., a virtual game controller 424, FIG. 4C), or automatically by a client program (e.g., 422, FIG. 4B). In some implementations, the electronic device executes the test application in accordance with features discussed above with reference to step 704.

While the test application is being executed and the encoder is encoding a data stream, the electronic device simulates (806) transmission of the encoded data stream through the selected simulation scenario (e.g., with the associated dynamic network parameters). In some implementations, the electronic device simulates the transmission in accordance with features discussed above with reference to step 706.

The electronic device records (808) the filtered data stream in memory in accordance with features discussed above with reference to step 708, and determines (810) quality metrics of the filtered data stream in accordance with features discussed above with reference to step 710. In some implementations, the electronic device determines one or more performance aspects of the network-enabled test application based on a plurality of the quality metrics for the filtered data stream (as described above), and associates one or more of the performance aspects with the current simulation scenario of the test application being tested.

In some implementations, testing and evaluation ends (812: yes) upon completion of the current simulation scenario, and in some implementations, the electronic device adjusts (814) one or more congestion management algorithms of the test application in accordance with features discussed above with reference to step 712.

Alternatively, testing and evaluation does not end (812: no) upon completion of the current simulation scenario, and in some implementations, the electronic device proceeds to step 802, at which one or more simulation scenarios are displayed for a subsequent simulation of the test application. For example, the electronic devices receives (803) a selection of a second affordance associated with a second network simulation scenario, and in response, the electronic device executes (804) the test application, simulates (806) transmission of the encoded data stream of the test application in a simulated test network for the second simulation scenario, records (808) the resulting filtered data stream, determines (810) quality metrics and performance aspects of the filtered data stream, and associates the performance aspects with the second simulation scenario.

In some implementations, after a plurality of simulations, the electronic device displays (e.g., on output device 224), on a results user interface (e.g., 630, FIG. 6D), one or more of the performance aspects of the test application associated with each simulation scenario that was run for that particular test application (e.g., simulation data for the first scenario 444-1(*vi*) and for the second scenario 444-2(*vi*)).

Figure 9:
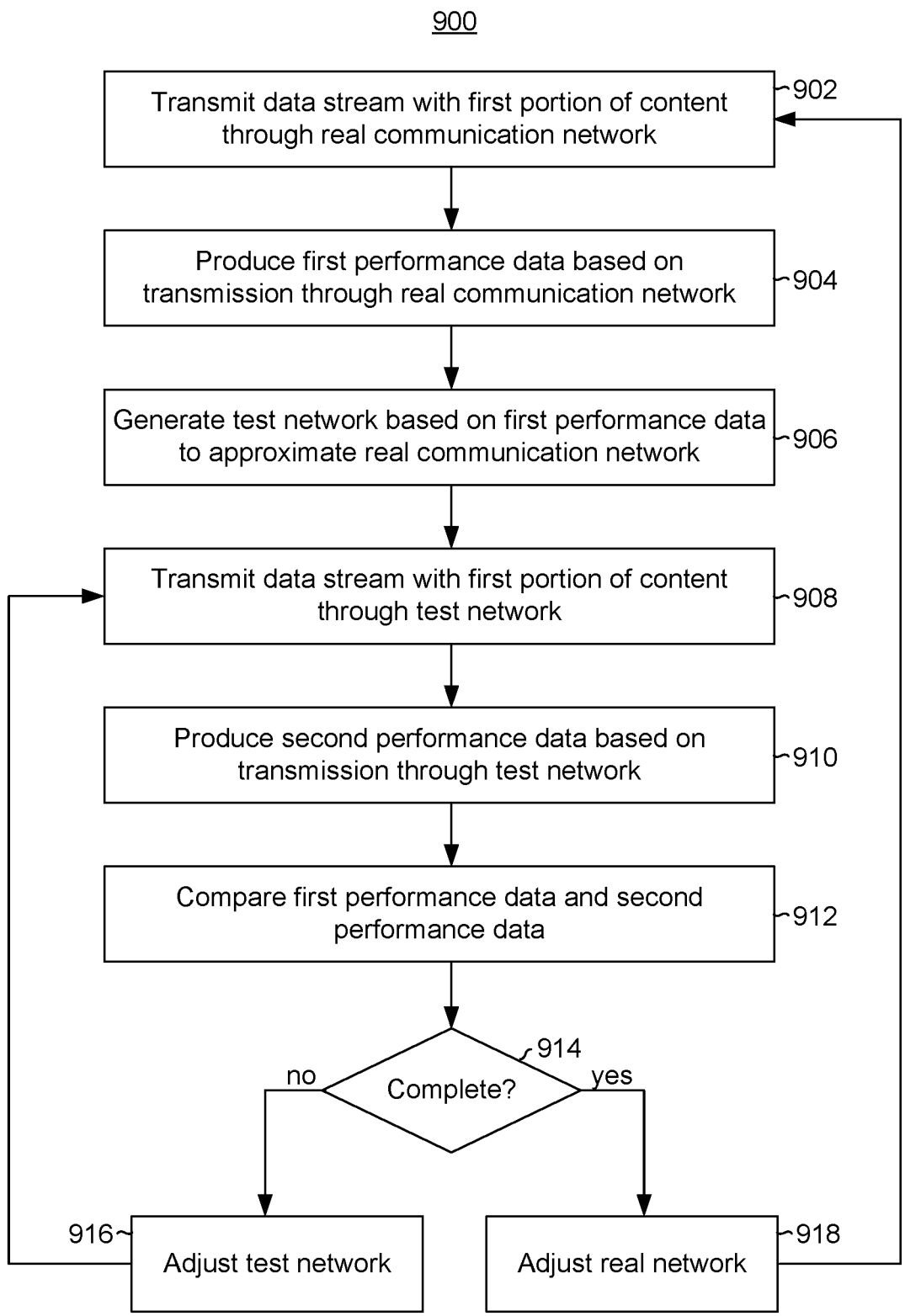
FIG. 9 is a flow diagram illustrating an example method for deriving parameters for simulation scenarios in accordance with some implementations.

FIG. 9 is a flow diagram of a method 900 for deriving parameters for simulation scenarios in accordance with some implementations. The method 900 may be performed at an electronic device (e.g., developer console 210 and/or simulation environment 230) having one or more processors (e.g., CPUs 214 and/or 234) and memory (e.g., memory 216 and/or 236) storing one or more programs for execution by the one or more processors. In some implementations, an electronic device includes one or more programs and memory storing one or more programs for execution by the one or more processors, and the one or more programs include instructions for performing the method 900. In some implementations, a non-transitory computer readable storage medium stores one or more programs, the one or more programs including instructions, which, when executed by an electronic device with one or more processors, causes the electronic device to perform the method 900.

An electronic device transmits (902) a first data stream including a first portion of content associated with a network-enabled test application to a user device through a real world communication environment (e.g., a Wi-Fi network set up in a real apartment, or a DSL network set up in a real office building, etc.).

The electronic device produces (904) first performance data for the transmission in step 902 by characterizing performance of the test application in the real world communication environment at the user device (e.g., by measuring various quality metrics and/or performance aspects as described above).

The electronic device generates (906) a test network based on the first performance data in order to approximate the real world communication network (e.g., programs a command recipe as described above with reference to FIG. 4E). In some implementations, a developer programs the command recipe.

The electronic device transmits (908) a second data stream including the first portion of content associated with the network-enabled test application to the client device through the test network generated in step 906 (e.g., subjects the data stream to impairments corresponding with the commands in the command recipe).

The electronic device produces (910) second performance data for the transmission in step 908 by characterizing performance of the test application in the test network at the user device (e.g., by measuring various quality metrics and/or performance aspects as described above).

The electronic device compares (912) the first performance data (associated with the real world network) with the second performance data (associated with the simulated test network).

If the first and second performance data are not equivalent to a predetermined degree (e.g., less than 90% similar), then the derivation of the parameters for the current simulation scenario is determined to be incomplete (914: no). In some implementations, upon the determination that the derivation of the parameters for the current simulation scenario is incomplete, one or more of the test network parameters for the current simulation scenario are adjusted (916), and the process continues at step 908.

However, if the first and second performance data are equivalent to a predetermined degree (e.g., at least 90% similar), then the derivation of the parameters for the current simulation scenario is determined to be complete (914: yes). In some implementations, upon the determination that the derivation of the parameters for the current simulation scenario is complete, the real world network is adjusted (918), or a new real world network is introduced, and the process repeats for the new real world network (and a new simulation scenario associated with the new real world network), beginning at step 902.

References have been made in detail to various implementations, examples of which are illustrated in the accompanying drawings. In the above detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

It will be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, without changing the meaning of the description, so long as all occurrences of the first device are renamed consistently and all occurrences of the second device are renamed consistently. The first device and the second device are both device, but they are not the same device.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method comprising:
   at a computing system having one or more processors and memory:
   obtaining a first network simulation scenario selected from a plurality of predefined network simulation scenarios, each of the network simulation scenarios embodying a specific combination of dynamic network parameters;
   executing a network-enabled test application;
   encoding a video stream associated with a plurality of specific operations of the network-enabled test application;
   simulating transmission of the encoded video stream in a simulated network for the first network simulation scenario with associated first dynamic network parameters;
   wherein at least one of the first dynamic network parameters is set to a first level during a first time period and a second level different from the first level during a second time period;
   wherein simulating transmission of the encoded video stream comprises modeling network impairments based on the first dynamic network parameters and generating, based on the encoded video stream and on the modeled network impairments, an additional video stream that is distinct from the encoded video stream and that reflects simulated real time effects of the modeled network impairments on the encoded video stream; and
   determining a plurality of time-varying quality metrics for the additional video stream.

2. The method of claim 1, further comprising:
   determining, based on the plurality of time-varying quality metrics, a simulated user experience value associated with the test application and the first network simulation scenario.

3. The method of claim 2, wherein determining the simulated user experience value comprises:
   deriving one or more simulated quality of service values from the plurality of time-varying quality metrics;
   comparing the one or more simulated quality of service values to one or more target quality of service values; and
   determining the simulated user experience value based on the comparison.

4. The method of claim 2, further comprising:
   displaying a rendering of the additional video stream; and
   determining the simulated user experience value based on quality of the displayed rendered additional video stream.

5. The method of claim 1, further comprising:
   determining, based on the plurality of time-varying quality metrics, one or more performance aspects of the network-enabled test application.

6. The method of claim 1, wherein the simulated real time effects include a specific dropped frame or a specific lost packet.

7. The method of claim 1, wherein a second of the first dynamic network parameters is set to a first level during the first and second time periods.

8. The method of claim 7, wherein the at least one of the first dynamic and the second of the first dynamic network parameters are selected from the group consisting of: latency, jitter, packet loss, channel noise, and channel bandwidth.

9. The method of claim 1, further comprising deriving the dynamic network parameters for respective predefined network simulation scenarios by:
   transmitting a first video stream including a first portion of content associated with the network-enabled test application to a user device through a respective real world communication environment;
   characterizing performance of the network-enabled test application in the real world communication environment at the user device to produce first performance data; and
   generating a simulated network based on the first performance data to approximate the real world communication environment.

10. The method of claim 9, wherein deriving the dynamic network parameters for respective predefined network simulation scenarios further comprises:

transmitting a second video stream including the first portion of content associated with the network-enabled test application to the user device through the simulated network;

characterizing performance of the network-enabled test application in the simulated network at the user device to produce second performance data; and adjusting one or more dynamic network parameters for a network simulation scenario corresponding to the real world communication environment based on a comparison of the first performance data with the second performance data.

11. A computing system comprising one or more processors and memory coupled to the one or more processors, the memory storing one or more programs configured to be executed by the one or more processors, the one or more programs including instructions for:

obtaining a first network simulation scenario selected from a plurality of predefined network simulation scenarios, each of the network simulation scenarios embodying a specific combination of dynamic network parameters;

executing a network-enabled test application;

encoding a video stream associated with a plurality of specific operations of the network-enabled test application;

simulating transmission of the encoded video stream in a simulated test network for the first network simulation scenario with associated first dynamic network parameters;

wherein at least one of the first dynamic network parameters is set to a first level during a first time period and a second level different from the first level during a second time period;

wherein simulating transmission of the encoded video stream comprises modeling network impairments based on the first dynamic network parameters and generating, based on the encoded video stream and on the modeled network impairments, an additional video stream that is distinct from the encoded video stream and that reflects simulated real time effects of the modeled network impairments on the encoded video stream; and determining a plurality of time-varying quality metrics for the additional video stream.

12. The computing system of claim 11, further comprising one or more programs including instructions for:

determining, based on the plurality of time-varying quality metrics, a simulated user experience value associated with the test application and the first network simulation scenario.

13. The computing system of claim 12, wherein determining the simulated user experience value comprises:

deriving one or more simulated quality of service values from the plurality of time-varying quality metrics;

comparing the one or more simulated quality of service values to one or more target quality of service values; and determining the simulated user experience value based on the comparison.

14. The computing system of claim 12, further comprising one or more programs including instructions for:

displaying a rendering of the additional video stream; and determining the simulated user experience value based on quality of the displayed rendering of the additional video stream.

15. The computing system of claim 11, further comprising one or more programs including instructions for:

determining, based on the plurality of time-varying quality metrics, one or more performance aspects of the network-enabled test application.

16. The computing system of claim 11, wherein the simulated real time effects include a specific dropped frame or a specific lost packet.

17. The method of claim 1, wherein generating the additional video stream comprises generating, in a network simulator of the computer system, the additional video stream for evaluation at the computer system.

* * * * *